US006924329B2

(12) United States Patent
Klun et al.

(10) Patent No.: US 6,924,329 B2
(45) Date of Patent: Aug. 2, 2005

(54) WATER- AND OIL-REPELLENT, ANTISTATIC COMPOSITIONS

(75) Inventors: Thomas P. Klun, Lakeland, MN (US); William M. Lamanna, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 720 days.

(21) Appl. No.: 09/992,877

(22) Filed: Nov. 5, 2001

(65) Prior Publication Data

US 2003/0149158 A1 Aug. 7, 2003

(51) Int. Cl.[7] ............................. C08K 5/34; C08K 5/59; D02G 3/00; B32B 5/02
(52) U.S. Cl. ....................... 524/100; 524/101; 524/114; 524/167; 524/195; 524/198; 524/213; 524/230; 524/236; 524/247; 524/263; 524/315; 524/366; 524/380; 428/375; 428/394; 252/8.62; 442/79; 442/82; 442/89; 525/185; 525/189; 525/190; 525/540
(58) Field of Search ................................. 524/101, 114, 524/167, 195, 198, 213, 230, 236, 247, 263, 315, 366, 380; 428/375, 394; 252/8.62; 442/79, 82, 89; 525/185, 189, 190, 540

(56) References Cited

U.S. PATENT DOCUMENTS

| 2,701,814 | A | 2/1955 | Smith |
| 2,732,398 | A | 1/1956 | Brice et al. |
| 2,803,656 | A | 8/1957 | Ahlbrecht et al. |
| 3,476,753 | A | 11/1969 | Hansen |
| 3,674,798 | A | 7/1972 | Price et al. |
| 3,723,512 | A | 3/1973 | Niederprum et al. |
| 3,728,151 | A | 4/1973 | Sherman et al. |
| 3,816,229 | A | 6/1974 | Bierbrauber |
| 3,896,035 | A | 7/1975 | Schultz et al. |
| 3,899,563 | A | 8/1975 | Oxenrider et al. |
| 3,901,727 | A | 8/1975 | Loudas |
| 3,916,053 | A | 10/1975 | Sherman et al. |
| 3,922,446 | A | 11/1975 | Heyden et al. |
| 3,968,066 | A | 7/1976 | Mueller |
| 4,014,880 | A | 3/1977 | Dowd et al. |
| 4,043,923 | A | 8/1977 | Loudas |
| 4,043,964 | A | 8/1977 | Sherman et al. |
| 4,219,625 | A | 8/1980 | Mares et al. |
| 4,264,484 | A | 4/1981 | Patel |
| 4,313,978 | A | 2/1982 | Stevens et al. |
| 4,335,201 | A | 6/1982 | Miller et al. |
| 4,439,505 | A | 3/1984 | Perlstein et al. |
| 4,478,922 | A | 10/1984 | Perlstein et al. |
| 4,582,781 | A | 4/1986 | Chen et al. |
| 4,624,889 | A | 11/1986 | Bries |
| 4,831,098 | A | 5/1989 | Watanabe et al. |
| 4,847,187 | A | 7/1989 | Ono et al. |
| 5,025,052 | A | 6/1991 | Crater et al. |

(Continued)

FOREIGN PATENT DOCUMENTS

| BE | 844200 | 1/1977 |
| BE | 876238 | 11/1979 |
| DE | 2456823 | 11/1991 |
| DE | 4016535 | 9/1993 |
| EP | 0 047 903 B1 | 8/1981 |
| EP | 0 047 903 B1 | 5/1984 |
| EP | 0 331 030 A1 | 9/1989 |
| EP | 0 398 353 A1 | 11/1990 |
| EP | 0 416 741 A1 | 3/1991 |
| EP | 0 613 462 B1 | 5/1993 |
| EP | 0 363 094 B1 | 8/1993 |
| EP | 0 752 711 A1 | 1/1997 |
| EP | 0 663 612 B1 | 3/2000 |
| JP | 50-45055 | 4/1975 |
| JP | 50045055 | 4/1975 |
| JP | 55149938 | 11/1980 |
| JP | 60221442 | 11/1985 |
| JP | 62225517 | 10/1987 |
| JP | 63059479 | 3/1988 |
| JP | 63071923 | 4/1988 |
| JP | 63295667 | 12/1988 |
| JP | 63308032 | 12/1988 |
| JP | 01075534 | 3/1989 |
| JP | 11116752 | 4/1990 |
| JP | 05289224 | 11/1993 |
| JP | 5-302077 | 11/1993 |
| JP | 08092450 | 4/1996 |
| JP | 08208889 | 8/1996 |
| JP | 08100169 | 9/1996 |
| JP | 0911887 | 5/1997 |
| JP | 09143882 | 6/1997 |

(Continued)

OTHER PUBLICATIONS

Product Information: "Fatty Amine Ethoxylates," Huntsman Corporation, Salt Lake City, UT, (Apr. 9, 2001), 2 pages.

Product Information: "JEFFAMINE® Polyoxyalkylene Amines," Huntsman Corporation, Salt Lake City, UT, (Apr. 9, 2001), 2 pages.

Book Excerpt: *Amphoteric Surfactants*, edited by Eric G. Lomax, Marcel Dekker Inc., (1996), pp. 13–17.

Book Excerpt: *Organofluorine Chemicals and Their Industrial Applications*, edited by R. E. Banks, Ellis Horwood Ltd. (1979), pp. 53–57.

Article: Hendricks, "Industrial Fluorochemicals," *Ind. Eng. Chem.*, vol. 45, No. 1, (Jan., 1953), pp. 99–105.

(Continued)

*Primary Examiner*—Kriellion A. Sanders

(57) ABSTRACT

A water- and oil-repellent, antistatic composition comprises (a) at least one polymeric salt consisting of (i) at least one cation having at least one polyoxyalkylene moiety bonded to a cationic nitrogen center, and (ii) at least one weakly coordinating anion, the conjugate acid of the anion having an acidity greater than or equal to that of a hydrocarbon sulfonic acid; (b) at least one fluorochemical repellent; and (c) at least one insulating material. The composition exhibits good antistatic and repellency characteristics.

48 Claims, No Drawings

U.S. PATENT DOCUMENTS

| | | |
|---|---|---|
| 5,064,699 A | 11/1991 | Havens et al. |
| 5,099,026 A | 3/1992 | Crater et al. |
| 5,145,727 A | 9/1992 | Potts et al. |
| 5,149,576 A | 9/1992 | Potts et al. |
| 5,171,641 A | 12/1992 | Roberts et al. |
| 5,273,840 A | 12/1993 | Dominey |
| 5,274,159 A | 12/1993 | Pellerite et al. |
| 5,382,778 A | 1/1995 | Takahira et al. |
| 5,446,134 A | 8/1995 | Armand et al. |
| 5,451,622 A | 9/1995 | Boardman et al. |
| 5,478,486 A | 12/1995 | Incorvia |
| 5,502,251 A | 3/1996 | Pohmer et al. |
| 5,503,967 A | 4/1996 | Furlan et al. |
| 5,514,493 A | 5/1996 | Waddell et al. |
| 5,518,788 A | 5/1996 | Invie |
| 5,525,261 A | 6/1996 | Incorvia et al. |
| 5,534,192 A | 7/1996 | Incorvia et al. |
| 5,541,049 A | 7/1996 | Ballerini et al. |
| 5,554,664 A | 9/1996 | Lamanna et al. |
| 5,560,992 A | 10/1996 | Sargent et al. |
| 5,591,482 A | 1/1997 | He et al. |
| 5,681,963 A | 10/1997 | Liss |
| 5,688,884 A | 11/1997 | Baker et al. |
| 5,723,664 A | 3/1998 | Sakaguchi et al. |
| 5,874,616 A | 2/1999 | Howells et al. |
| 5,965,206 A | 10/1999 | Hilti et al. |
| 6,294,289 B1 | 9/2001 | Fanta et al. |
| 6,592,988 B1 * | 7/2003 | Thompson et al. ......... 428/375 |

FOREIGN PATENT DOCUMENTS

| | | |
|---|---|---|
| JP | 09255939 | 9/1997 |
| JP | 9-323956 | 12/1997 |
| JP | 11092751 | 6/1999 |
| SU | 406849 | 8/1974 |
| SU | 427962 | 6/1975 |
| SU | 446522 | 7/1975 |
| SU | 448199 | 10/1975 |
| SU | 854949 | 8/1981 |
| SU | 749081 | 12/1983 |
| SU | 749084 | 12/1983 |
| WO | WO 96/15479 | 5/1996 |
| WO | WO 96/24929 | 8/1996 |
| WO | WO 97/22576 | 6/1997 |
| WO | WO 97/22659 | 6/1997 |
| WO | WO 97/22660 | 6/1997 |
| WO | WO 99/02611 | 1/1999 |
| WO | WO 99/30381 | 6/1999 |
| WO | WO 01/25326 | 4/2001 |
| WO | WO 01/49925 | 7/2001 |
| ZA | 9804155 | 5/1998 |

OTHER PUBLICATIONS

Article: Bernett et al., "Wetting of Low–Energy Solids by Aqueous Solutions of Highly Fluorinated Acids and Salts[1]," *J. Phys. Chem.*, vol. 63, (Nov., 1959), pp. 1911–1916.

Book Page: *Preparation, Properties, and Industrial Applications of Organofluorine Compounds*, edited by R. E. Banks, Ellis Horwood Ltd. (1982), p. 25.

Article: Koshar et al., "Bis(perfluoroalkylsulfonyl)methanes and Related Disulfones," *J. Org. Chem.*, vol. 38, No. 19, (1973), pp. 3358–3363.

Article: Wente, "Superfine Thermoplastic Fibers," *Industrial and Engineering Chemistry*, vol. 48, No. 8, (Aug., 1956), pp. 1342–1346.

Report: Wente et al., "Manufacture of Superfine Organic Fibers," Naval Research Laboratory Report 4364, (May 25, 1954), pp. 1–15.

Article: Davis, "The Separation of Airborne Dust and Particles", *The Institution of Mechanical Engineers*, pp. 185–198.

J. Am. Chem. Soc., "Fluorinated Surfactants and Repellents", Jimmie R. Baran, Jr., Second Edition, vol. 123, No. 36, 2001.

ASTM D–257–99, Standard Test Methods for DC Resistance or Conductance of Insulating Materials, pp. 106–115.

* cited by examiner

WATER- AND OIL-REPELLENT, ANTISTATIC COMPOSITIONS

FIELD OF THE INVENTION

This invention relates to compositions that exhibit both antistatic and repellency characteristics. This invention further relates to fibers, films, fabrics, coatings, or molded or blown articles comprising these compositions. In other aspects, this invention relates to a topical treatment composition and to processes for imparting both antistatic and repellency characteristics to insulating materials.

BACKGROUND OF THE INVENTION

Various fluorochemicals have been used to impart water and oil repellency to a variety of substrates (for example, textiles, carpet, leather, paper, and non-woven webs). These fluorochemicals have most often been applied topically (for example, by spraying, padding, or finish bath immersion), but some fluorochemicals have also been useful as polymer melt additives for preparing water- and oil-repellent polymeric fibers, films, fabrics, etc. The resulting repellent substrates have found use in numerous applications where water and/or oil repellency characteristics have been valued.

For some applications, however, antistatic properties have also been necessary or desirable, particularly in combination with repellency.

Antistats or antistatic agents are used to dissipate electrostatic or static charge. Electrostatic charge build-up is responsible for a variety of problems in the processing and use of many industrial products and materials. Electrostatic charging can cause materials to stick together or to repel one another. This is a particular problem in fiber and textile processing. In addition, static charge build-up can cause objects to attract dirt and dust, thereby decreasing the effectiveness of fluorochemical repellents.

Sudden electrostatic discharges from insulating objects can also be a serious problem. With photographic film, these discharges can cause fogging and the appearance of artifacts. When flammable materials are present, a static electric discharge can serve as an ignition source, resulting in fires and/or explosions. Electrostatic charge is a particular problem in the electronics industry because modern electronic devices are extremely susceptible to permanent damage by electrostatic discharges. The build-up of electrostatic charge in insulating objects is especially common and problematic under conditions of low humidity and when liquids or solids move in contact with one another (tribocharging).

But conventional antistats (many of which are humectants that rely on the adsorption and conductivity of water for charge dissipation) have generally not been very effective in combination with fluorochemical repellents. The result of this combination has often been a substantial reduction or even elimination of either antistatic and/or repellency characteristics relative to the use of either additive alone.

Furthermore, it has been particularly difficult to combine conventional antistats and fluorochemical repellents in polymer melt processing applications, as, for example, the water associated with humectant antistats vaporizes rapidly at melt processing temperatures. This has resulted in the undesirable formation of bubbles in the polymer and has caused screw slippage in extrusion equipment. Many antistats have also lacked the requisite thermal stability, leading to the production of objectionable odors (for example, in melt blowing applications, where high extrusion temperatures are involved).

Thus, there remains a need in the art for antistatic agents and repellents that can be effectively combined to impart both good antistatic characteristics and good repellency characteristics to substrates in a cost effective manner and that, in particular, can be utilized as internal melt additives without suffering thermal decomposition, or causing processing problems or melt defects.

SUMMARY OF THE INVENTION

Advantageously, the present invention provides a composition for imparting good antistatic characteristics as well as good repellency characteristics to insulating materials or substrates. Additionally, these inventive compositions are preferably melt processable.

Briefly, in one aspect, the present invention provides a composition comprising at least one antistatic agent comprising at least one polymeric salt and at least one fluorochemical repellent. The polymeric salt consists of at least one cation having at least one polyoxyalkylene moiety bonded to at least one cationic nitrogen center and at least one anion.

This at least one cation preferably is a polyoxyalkylene ammonium compound represented by one of the following formulae:

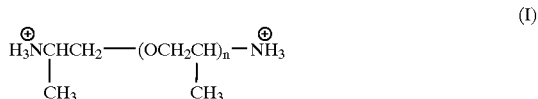

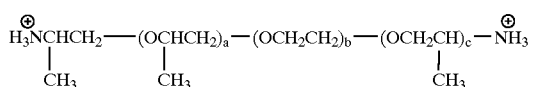

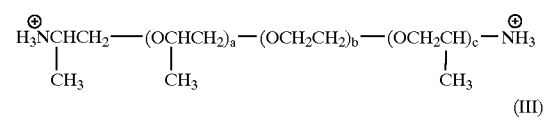

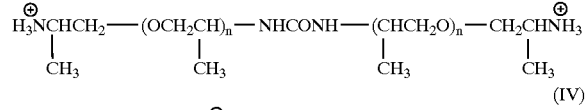

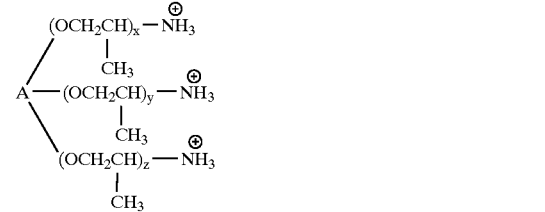

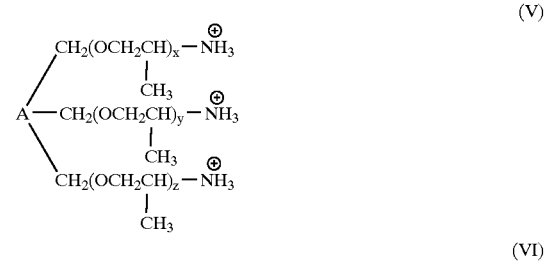

wherein, n is an integer of 3 to 50, b is an integer of 5 to 150, a and c, the same or different, each is an integer from 0 to 5, such that a+c is an integer from 2 to 5, A is a CH≡, $CH_3C\equiv$, $CH_3CH_2C\equiv$, or a

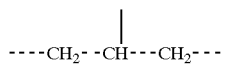

group, and x, y and z, equal or different, are integers of 1 to 30 such that the sum of $x+y+z \geq 5$.

POA is either a homopolymer or a copolymer that is random, blocked, or alternating, and POA comprises 2 to 50 units represented by the formula $((CH_2)_m CH(R^3)O)$ where each unit independently has m, an integer from 1 to 4, and $R^3$. $R^3$ is independently hydrogen or a lower alkyl group (i.e., containing 1 to 4 carbon atoms). $R^1$ is independently an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). $R^2$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And d is an integer from 1 to 4.

For blend compositions or applications, the anion(s) is a weakly coordinating anion, the conjugate acid of the anion (s) having an acidity greater than or equal to that of the hydrocarbon sulfonic acid.

For topical treatments or applications, the anion(s) is a weakly coordinating fluoroorganic anion.

Additionally, the compositions of the present invention may further comprise an insulating material.

The present invention provides a water- and oil-repellent, antistatic composition comprising the blend of (a) at least one polymeric salt consisting of (i) at least one cation having at least one polyoxyalkylene moiety bonded to a cationic nitrogen center and (ii) at least one weakly coordinating anion, the conjugate acid of the anion having an acidity greater than or equal to that of a hydrocarbon sulfonic acid; and (b) at least one fluorochemical repellent; wherein said composition is blended with at least one insulating material.

The antistatic agents can be effectively combined with fluorochemical repellents to impart both good antistatic characteristics and good repellency characteristics to a variety of insulating materials. The antistatic agents and repellents can be combined not only in topical treatments (external additives), but even (and preferably) as melt additives (internal additives) without suffering thermal decomposition or causing processing problems or melt defects. The antistat/repellent combination used in the composition of the present invention is surprisingly effective at dissipating the static charge that can accumulate in (or on) an otherwise insulating substrate such as a polymer film or fabric, while also imparting durable water and oil repellency (and soil resistance). Even more surprisingly, when used in topical treatments or as polymer melt additives in polypropylene melt-blown nonwoven fabric, certain preferred antistats exhibit synergistic behavior when combined with the repellent(s), in that better static dissipation rates are obtained than when the antistats are used alone.

The combination of antistat(s) and fluorochemical repellent(s) used in the composition of the invention is compatible with a variety of polymers. In addition, because many of the antistats are stable at high temperatures (e.g., at least 180° C.), the combination of these antistat(s) with thermally stable fluorochemical repellent(s) is particularly well-suited for use in high temperature polymer melt additive applications and in applications where the use temperatures are very high.

The combination of antistat(s) and fluorochemical repellent(s) used in the composition of the invention therefore meets the need in the art for antistatic agents and repellents that can be effectively combined to impart both good antistatic characteristics and good repellency characteristics to substrates and that, in particular, can be utilized as melt additives without causing processing problems or melt defects.

In other aspects, this invention provides fiber, fabric, film, a coating, or a molded or blown article comprising the composition of the invention; processes for imparting both repellency and antistatic characteristics to an insulating material, for example, by blending (e.g., melt blending) or by topical treatment; and a topical treatment composition comprising (a) at least one polymeric salt consisting of (i) at least one cation having at least one polyoxyalkylene moiety bonded to a cationic nitrogen center and (ii) at least one weakly coordinating fluoroorganic anion; and (b) at least one fluorochemical repellency-imparting additive or repellent.

In yet other aspects, this invention provides a blend of at least one antistat, at least one fluorochemical repellent and at least one insulating material or reactive precursor to the insulating material where the reactive precursor to the insulating material is a monomer, a curable oligomer, or a curable polymer.

DETAILED DESCRIPTION OF THE ILLUSTRATIVE EMBODIMENTS

The present invention provides compositions having good antistatic and good repellency properties. These compositions comprise one or more antistatic agents and one or more repellents. Antistatic agents and antistats are used interchangeably herein. The antistatic agents and repellents can be used with insulating materials such as, for example, thermoplastic or thermosetting polymers. In particular, the present invention is directed to blend compositions that comprise a polymeric salt consisting of at least one cation having at least one polyoxyalkylene moiety bonded to a cationic nitrogen center and one or more weakly coordinating anions and at least one fluorochemical repellent, and to topical treatment compositions that comprise a polymeric salt consisting of at least one cation having at least one polyoxyalkylene moiety bonded to a nitrogen center and at least one weakly coordinating fluoroorganic anion and at least one fluorochemical repellent.

A "blend" is defined herein as a mixture of at least one antistat, at least one fluorochemical repellent, and at least one insulating material or a reactive precursor to the insulating material, such as a monomer, a curable oligomer, or a curable polymer.

A "topical treatment" is defined herein as the combination of at least one antistat and at least one fluorochemical repellent applied to the surface of a preformed insulating material or substrate, typically in a solvent or a dispersant.

Antistatic Agents

Polymeric salts suitable for use as antistatic agents of the present invention have at least one cation having at least one polyoxyalkylene moiety bonded to at least one cationic nitrogen center. The polymeric salts in blend applications have at least one anion that is weakly coordinating. The polymeric salts in topical treatment applications have at least one weakly coordinating fluoroorganic anion.

Polyoxyalkylene Cation

The antistatic agent of the present invention comprises a polymeric salt consisting of at least one cation having at least one polyoxyalkylene moiety bonded to at least one ammonium center. These polyoxyalkylene ammonium compounds can be a monofunctional or a multifunctional cation.

Additionally, these polyoxyalkylene ammonium compounds contain ammonium groups attached to the end of a polyoxyalkylene chain. The polyoxyalkylene chain is typically based either on propylene oxide, ethylene oxide, or mixed ethylene/propylene oxide. The polyoxyalkylene ammonium compounds comprise mono-ammonium, di-ammonium, and tri-ammonium compounds having molecular weights ranging from about 200 to about 10,000.

Particularly representative polyoxyalkylene ammonium compounds are those represented by the following general formulae (I) to (VI), where the number of repeat units for the polyoxyalkylene moieties is approximate:

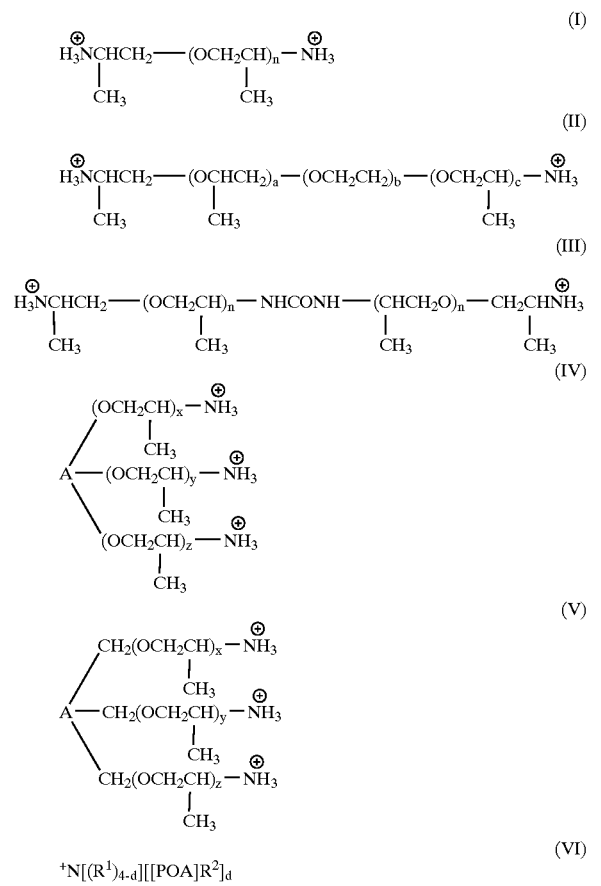

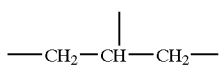

group, x, y and z, equal or different, are integers of 1 to 30 such that the sum of $x+y+z \geq 5$, POA is either a homopolymer or a copolymer that is random, blocked, or alternating, and POA comprises 2 to 50 units represented by the formula $((CH_2)_m CH(R^3)O)$ where each unit independently has m, an integer from 1 to 4, and $R^3$. $R^3$ is independently hydrogen or a lower alkyl group (i.e., containing 1 to 4 carbon atoms). $R^1$ is independently an alkyl, an alicyclic, an aryl, an alkalicyclic, an arylalicyclic, or an alicyclicaryl group optionally contains one or more heteroatoms (e.g., sulfur, nitrogen, oxygen, chlorine, bromine, or fluorine). $R^2$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And d is an integer from 1 to 4.

Examples of polyoxyalkylene amine compounds useful as precursors to the antistatic agents of the present invention are illustrated below. The number of repeat units for the polyoxyalkylene moieties is approximate.

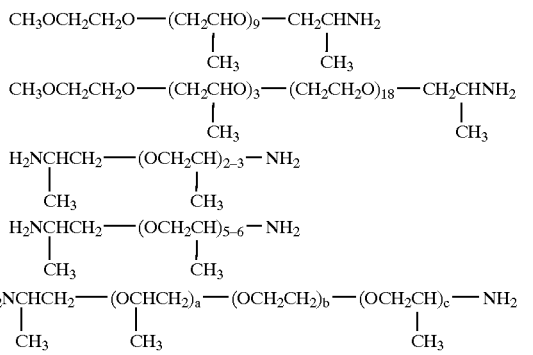

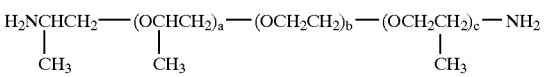

wherein b is ~8.5 and a + c is ~2.5

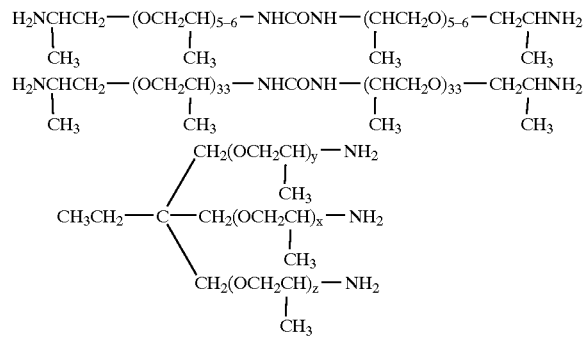

wherein b is ~15.5 and a + c is ~2.5

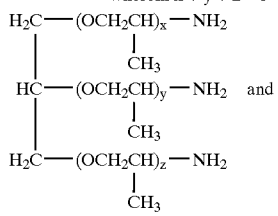

wherein x + y + z ~ 5–6

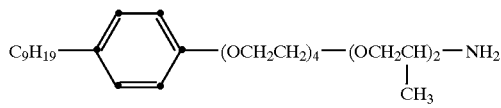

wherein x + y + z ~ 30

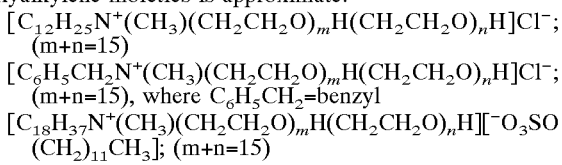

Examples of polyoxyalkylene ammonium compounds that are useful as antistatic agents of the present invention or as precursors to antistatic agents of the present invention are illustrated below. The number of repeat units for the polyoxyalkylene moieties is approximate.

$[C_{12}H_{25}N^+(CH_3)(CH_2CH_2O)_m H(CH_2CH_2O)_n H]Cl^-$; (m+n=15)

$[C_6H_5CH_2N^+(CH_3)(CH_2CH_2O)_m H(CH_2CH_2O)_n H]Cl^-$; (m+n=15), where $C_6H_5CH_2$=benzyl $[C_{18}H_{37}N^+(CH_3)(CH_2CH_2O)_m H(CH_2CH_2O)_n H][^-O_3SO(CH_2)_{11}CH_3]$; (m+n=15)

[C$_{18}$H$_{37}$N$^+$(CH$_3$)(CH$_2$CH$_2$O)$_m$H(CH$_2$CHCH$_3$O)$_n$H][$^-$O$_3$SOCH$_3$]; (m+n=15)

[C$_{12}$H$_{25}$N$^+$(CH$_3$)(CH$_2$CH$_2$O)$_m$H(CH$_2$CH$_2$O)$_n$H][$^-$O$_3$SC$_6$H$_4$C$_{12}$H$_{25}$]; (m+n=15)

[C$_{12}$H$_{25}$N$^+$(CH$_3$)$_2$(CH$_2$CHCH$_3$O)$_m$H][$^-$O$_3$SCH$_3$]; (m=15)

[C$_{12}$H$_{25}$N$^+$(CH$_3$)$_2$(CH$_2$CH$_2$CH$_2$CH$_2$O)$_m$H]Cl$^-$; (m=15)

[C$_{12}$H$_{25}$N$^+$(CH$_3$)$_2$(CH$_2$CH$_2$O)$_m$H][$^-$O$_3$SOCH$_3$]; (m=15)

[C$_8$H$_{17}$N$^+$(CH$_3$)$_2$(CH$_2$CH$_2$O)$_m$H][$^-$O$_3$SO(CH$_2$)$_{11}$CH$_3$]; (m=8)

[C$_{12}$H$_{25}$N$^+$(CH$_2$CH$_2$O)$_m$H(CH$_2$CH$_2$O)$_n$H(CH$_2$CH$_2$O)$_o$H][$^-$O$_3$SOCH$_3$]; (m+n+o=15), and

[N$^+$(CH$_2$CH$_2$O)$_m$H(CH$_2$CH$_2$O)$_n$H(CH$_2$CH$_2$O)$_o$H(CH$_2$CH$_2$O)$_p$H]Cl$^-$; (m+n+o+p=20)

Examples of difunctional or trifunctional amine terminated polyethylene oxides useful as precursors to the antistats of the present invention include, but are not limited to, JEFFAMINE™ Polyalkylene Amines, available from Huntsman Corporation, Salt Lake City, Utah. JEFFAMINE™ Polyalkylene Amines are generally described as containing primary amino groups attached to the terminus of a polyether backbone. The polyether backbone is based either on propylene oxide, ethylene oxide, or mixed propylene oxide/ethylene oxide.

Examples of quaternary polyoxyalkylene ammonium salts useful as antistats of the present invention or as precursors to the antistats of the present invention include C$_{12}$H$_{25}$N$^+$(CH$_3$)[(CH$_2$CH$_2$O)$_m$H][(CH$_2$CH$_2$O)$_n$H]$^-$Cl; (m+n=15), which is ETHOQUAD™ C/25, and C$_{18}$H$_{37}$N$^+$(CH$_3$)[(CH$_2$CH$_2$O)$_m$H][(CH$_2$CH$_2$O)$_n$H]$^-$Cl (m+n=15), which is ETHOQUAD™ 18/25, (both are available from Akzo Nobel Surface Chemistry LLC, Chicago, Ill.).

C$_{12}$H$_{25}$N$^+$(CH$_3$)[(CH$_2$CH$_2$O)$_m$H][(CH$_2$CH$_2$O)$_n$H]$^-$OSO$_3$CH$_3$ (m+n=5), which is derived from ETHOMEEN™ C/15 (available from Akzo Nobel Surface Chemistry LLC.) via its reaction with dimethylsulfate, is a useful antistat of the present invention and can also be used as a precursor to other antistats of the present invention.

The polyoxyalkylene ammonium compounds of the present invention can be prepared using methods known in the art.

Anions

The antistatic agents of the present invention comprise a polymeric salt consisting of at least one anion.

For topical treatment compositions or applications, the anion(s) is a weakly coordinating fluoroorganic anion.

For blend compositions or applications, the anion(s) is a weakly coordinating anion.

Suitable weakly coordinating anions have a conjugate acid that is at least as acidic as a hydrocarbon sulfonic acid (preferably, a hydrocarbon sulfonic acid having from 1 to about 20 carbon atoms; more preferably, an alkane, aryl, or alkaryl sulfonic acid having from 1 to about 8 carbon atoms; even more preferably, methane or p-toluene sulfonic acid; most preferably, p-toluene sulfonic acid). Preferably, the conjugate acid is a strong acid. More preferably, the Hammett acidity function, H$_0$, of the neat conjugate acid of the anion is less than about −7 (most preferably, less than about −10).

Representative examples of suitable weakly coordinating anions include BF$_4$$^-$; PF$_6$$^-$; SbF$_6$$^-$; AsF$_6$$^-$; ClO$_4$$^-$; NO$_3$$^-$; Cl$^-$; Br$^-$; F$^-$; HSO$_4$$^-$; H$_2$PO$_4$$^-$; organic anions such as alkane, aryl, and alkaryl sulfonates; alkane, aryl, alkaryl sulfates; fluorinated and unfluorinated tetraarylborates; carborane anions and halogen-, alkyl-, or haloakyl-substituted carborane anions including metallocarborane anions; teflates (for example, $^-$OTeF$_5$, $^-$B(OTeF$_5$)$_4$, and $^-$Pd(OTeF$_5$)$_4$); and fluoroorganic anions such as fluorinated arylsulfonates, perfluoroalkanesulfonates, cyanoperfluoroalkanesulfonylamides, bis(cyano) perfluoroalkanesulfonylmethides, bis(perfluoroalkanesulfonyl)imides, cyano-bis-(perfluoroalkanesulfonyl)methides, bis(perfluoroalkanesulfonyl)methides, and tris(perfluoroalkanesulfonyl)methides; and the like.

Examples of suitable weakly coordinating fluoroorganic anions include structures A, B, and C:

wherein each R$_f$ is independently a fluorinated alkyl or aryl group that may be cyclic or acyclic, saturated or unsaturated, and may optionally contain catenated ("in-chain") or terminal heteroatoms such as N, O, and S (e.g., —SF$_4$— or —SF$_5$). Q is independently an SO$_2$ or a CO linking group and X is selected from the group QR$_f$, CN, halogen, H, alkyl, aryl, Q-alkyl, and Q-aryl. Any two contiguous R$_f$ groups may be linked to form a ring. Preferably, R$_f$ is a perfluoroalkyl group, Q is SO$_2$ and each X is QR$_f$.

The fluoroorganic anions can be either fully fluorinated, that is perfluorinated, or partially fluorinated (within the organic portion thereof). Preferred fluoroorganic anions include those that comprise at least one highly fluorinated alkanesulfonyl group, that is, a perfluoroalkanesulfonyl group or a partially fluorinated alkanesulfonyl group wherein all non-fluorine carbon-bonded substituents are bonded to carbon atoms other than the carbon atom that is directly bonded to the sulfonyl group (preferably, all non-fluorine carbon-bonded substituents are bonded to carbon atoms that are more than two carbon atoms away from the sulfonyl group).

Preferably, the fluoroorganic anion is at least about 80 percent fluorinated (that is, at least about 80 percent of the carbon-bonded substituents of the anion are fluorine atoms). More preferably, the anion is perfluorinated (that is, fully fluorinated, where all of the carbon-bonded substituents are fluorine atoms). The anions, including the preferred perfluorinated anions, can contain one or more catenated (that is, in-chain) or terminal heteroatoms such as, for example, nitrogen, oxygen, or sulfur (e.g., —SF$_5$ or —SF$_4$—).

Preferred anions for blend compositions and applications include organic and fluoroorganic anions (more preferably, perfluoroalkanesulfonates, fluoroorganic anions with two or three sulfonate groups, bis(perfluoroalkanesulfonyl)imides, and tris(perfluoroalkanesulfonyl)methides; most preferably, perfluoroalkanesulfonates and bis(perfluoroalkanesulfonyl) imides). Preferred anions for the topical treatment compositions and applications are perfluorinated where all X's are QR$_f$ and all Q's are SO$_2$, more preferably the anion is a perfluoroalkanesulfonate or a bis(perfluoroalkanesulfonyl) imide, most preferably the anion is a bis(perfluoroalkanesulfonyl)imide.

The antistats can be solids or liquids under ambient conditions.

For use as polymer melt additives, the antistats are preferably stable at temperatures of about 240° C. and above (more preferably, about 280° C. and above). (In other words, the thermal decomposition temperature (i.e., the temperature where there is 5% or more weight loss using thermo gravimetric analysis (TGA) as described in Test Method 1) of the antistats is preferably above these temperatures.) In addition, the antistats are preferably miscible with the insulating materials at the melt processing temperature.

There are two general methods that can be used to prepare the antistatic agents of the present invention. First, one can protonate the amine group of a polyoxyalkylene amine with the conjugate acid of the weakly coordinating anion (preferably in the presence of hydroxylic or ether containing solvents such as water, isopropyl ether, methyl t-butyl ether, diethyl ether, or the like), and then isolate the antistatic agent using techniques known in the art. Second, ion exchange, or metathesis reactions, which are well known in the art, can be used where polyoxyalkylene ammonium salts of simple anions such as halide, sulfate, nitrate, mesylate, or acetate, and the like are available as precursors. For example, a precursor ammonium salt can be combined with the acid or salt of a weakly coordinating anion in aqueous solution. Upon combining, the desired product (the ammonium salt of the weakly coordinating anion) separates (as a liquid or solid) or can be preferentially extracted into an organic solvent (for example, methylene chloride). The product can be isolated by filtration or by liquid/liquid phase separation, can be washed with water to completely remove byproduct acid or salt (if present), and can then be dried thoroughly under vacuum to remove all volatiles (including water and organic solvent, if present). Similar metathesis reactions can be conducted in organic solvents (for example, acetonitrile) rather than in water, and, in this case, the salt byproduct generally preferentially precipitates, while the desired product salt remains dissolved in the organic solvent (from which it can be isolated using standard experimental techniques).

Examples of antistatic agents of the present invention include, but are not limited to, the following where the number of repeat units for the polyoxyalkylene moieties is approximate,

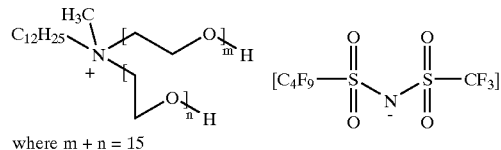

where m + n = 15

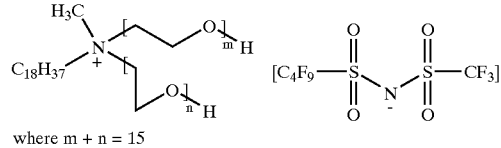

where m + n = 15

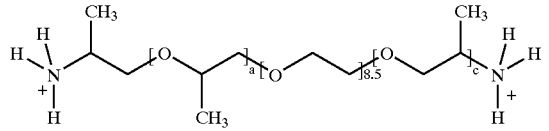

-continued

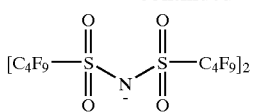

where a + c ~ 2.5

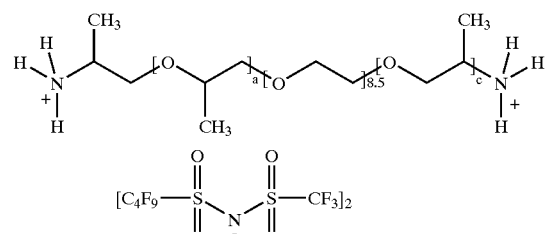

where a + c ~ 2.5

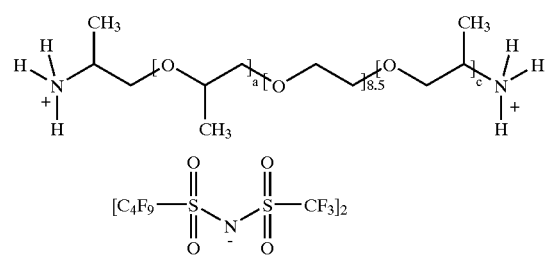

where a + c ~ 2.5

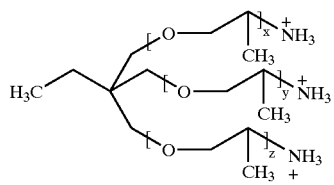

where x + y + z ~ 5–6

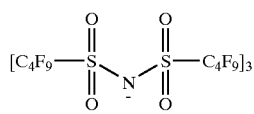

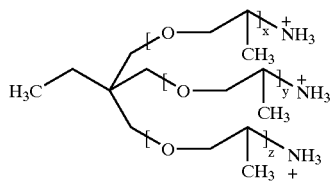

where x + y + z ~ 5–6

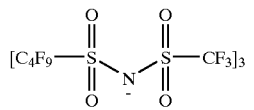

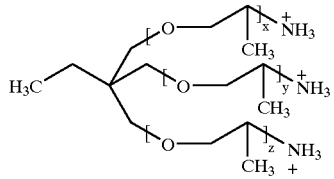

where x + y + z ~ 5–6

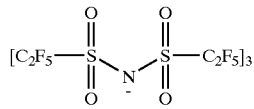

-continued

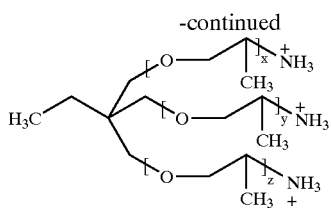

where x + y + z ~ 5–6

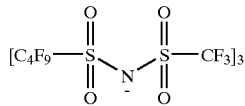₃

$C_{12}H_{25}N^+[CH_3][CH_2CH_2O)_mH][(CH_2CH_2O)_nH]^-N(SO_2C_4F_9)_2$; (m+n=15),
$C_{18}H_{37}N^+[CH_3][(CH_2CH_2O)_mH][(CH_2CH_2O)_nH]^-N(SO_2C_4F_9)_2$; (m+n=15),
$C_{12}H_{25}N^+[CH_3][(CH_2CH_2O)_mH][(CH_2CH_2O)_nH]^-N(SO_2C_4F_9)_2$; (m+n=5),

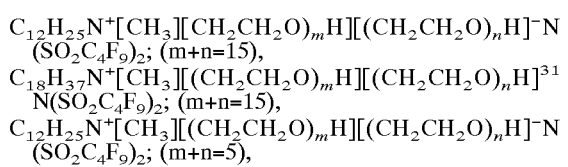

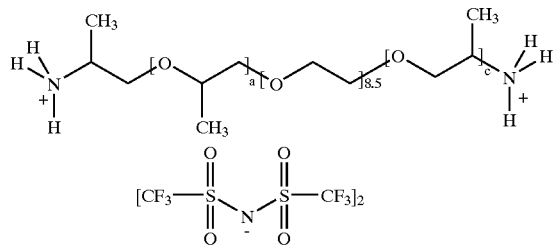₂ where a + c ~ 2.5

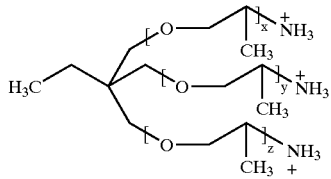

where x + y + z ~ 5.3

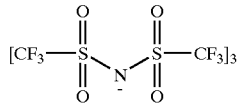₃

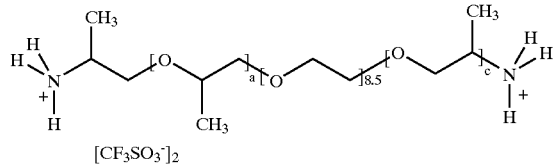

[CF₃SO₃⁻]₂ where a + c ~ 2.5

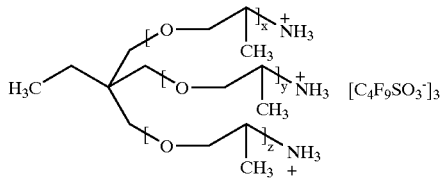 [C₄F₉SO₃⁻]₃ where x+y+z~5–6

$[C_{12}H_{25}N^+(CH_3)(CH_2CH_2O)_mH(CH_2CH_2O)_nH][^-O_3SCF_3]$; (m+n=15),
$[C_{12}H_{25}N^+(CH_3)(CH_2CH_2O)_mH(CH_2CH_2O)_nH][^-N(SO_2CF_3)_2]$; (m+n=15)
$[C_6H_5CH_2N^+(CH_3)(CH_2CH_2O)_mH(CH_2CH_2O)_nH][^-O_3SC_4F_9]$; (m+n=15), where $C_6H_5CH_2$=benzyl $[C_{12}H_{25}N^+(CH_3)(CH_2CH_2O)_mH(CH_2CH_2O)_nH][^-O_3SC_4F_9]$; (m+n=15)
$[C_{18}H_{37}N^+(CH_3)(CH_2CH_2O)_mH(CH_2CH_2O)_nH][^-O_3SCF_3]$; (m+n=15)
$[C_{18}H_{37}N^+(CH_3)(CH_2CH_2O)_mH(CH_2CH_2O)_nH][^-N(SO_2CF_3)_2]$; (m+n=15)
$[C_{18}H_{37}N^+(CH_3)(CH_2CH_2O)_mH(CH_2CH_2O)_nH][^-O_3SC_4F_9]$; (m+n=15)
$[C_{18}H_{37}N^+(CH_3)(CH_2CH_2O)_mH(CH_2CHCH_3O)_nH][^-O_3SC_4F_9]$; (m+n=15)
$[C_{12}H_{25}N^+(CH_3)(CH_2CH_2O)_mH(CH_2CH_2O)_nH][^-O_3SCF_3$; (m+n=15)
$[C_8H_{17}N^+(CH_3)_2(CH_2CH_2O)_mH][^-O_3SCF_3]$; (m=15)
$[C_8H_{17}N^+(CH_3)_2(CH_2CH_2O)_mH][^-O_3SC_4F_9]$; (m=15)
$[C_8H_{17}N^+(CH_3)_2(CH_2CH_2O)_mH][^-N(SO_2CF_3)_2]$; (m=15)
$[C_{12}H_{25}N^+(CH_3)_2(CH_2CH_2O)_mH][^-O_3SCF_3]$; (m=15)
$[C_{12}H_{25}N^+(CH_3)_2(CH_2CHCH_3O)_mH][^-O_3SCF_3]$; (m=15)
$[C_{12}H_{25}N^+(CH_3)_2(CH_2CH_2CH_2CH_2O)_mH][^-O_3SCF_3]$; (m=15)
$[C_{18}H_{37}N^+(CH_3)_2(CH_2CH_2O)_mH][^-N(SO_2CF_3)_2]$; (m=15)
$[C_8H_{17}N^+(CH_3)_2(CH_2CH_2O)_mH][^-O_3SCF_3]$; (m=8)
$[C_{18}H_{37}N^+(CH_3)_2(CH_2CH_2O)_mH][^-N(SO_2CF_3)_2]$; (m=8)
$[C_{12}H_{25}N^+(CH_2CH_2O)_mH(CH_2CH_2O)_nH(CH_2CH_2O)_oH][^-O_3SCF_3]$; (m+n+o=15),
$[C_{12}H_{25}N^+(CH_2CH_2O)_mH(CH_2CH_2O)_nH(CH_2CH_2O)_oH][^-N(SO_2CF_3)_2]$; (m+n+o=15)
$[C_{12}H_{25}N^+(CH_2CH_2O)_mH(CH_2CH_2O)_nH(CH_2CH_2O)_oH][^-O_3SC_4F_9]$; (m+n+o=15)
$[N^+(CH_2CH_2O)_mH(CH_2CH_2O)_nH)(CH_2CH_2O)_oH(CH_2CH_2O)_pH][^-O_3SCF_3]$; (m+n+o+p=20)
$[N^+(CH_2CH_2O)_mH(CH_2CH_2O)_nH(CH_2CH_2O)_oH(CH_2CH_2O)_pH][^-N(SO_2CF_3)_2]$; (m+n+o+p=20)
$[C_{12}H_{25}N^+(CH_3)(CH_2CH_2O)_mH(CH_2CH_2O)_nH]_2[^-O_3SCF_2CF_2SO_3—]$; (m+n=15)
$[C_{12}H_{25}N^+(CH_3)(CH_2CH_2O)_mH(CH_2CH_2O)_nH]_2[^-O_3S—CF_2CF_2—N(CF_2CF_2)_2N—CF_2CF_2SO_3^-]$; (m+n=15)
$[C_{12}H_{25}N^+(CH_3)(CH_2CH_2O)_mH(CH_2CH_2O)_nH][^-N(SO_2CF_3)CN]$; (m+n=15)
$[C_{12}H_{25}N^+(CH_3)(CH_2CH_2O)_mH(CH_2CH_2O)_nH][^-C(SO_2CF_3)_3]$; (m+n=15)
$[C_{12}H_{25}N^+(CH_3)(CH_2CH_2O)_mH(CH_2CH_2O)_nH][^-C(SO_2CF_3)_2CN]$; (m+n=15)
$[C_{12}H_{25}N^+(CH_3)(CH_2CH_2O)_mH(CH_2CH_2O)_nH][^-C(SO_2CF_3)_2H]$; (m+n=15)
$[C_{12}H_{25}N^+(CH_3)(CH_2CH_2O)_mH(CH_2CH_2O)_nH][^-C(SO_2CF_3)(CN)_2]$; (m+n=15)
$[CH_3(OCH_2CH_2)_{19}(OCH_2CHCH_3)_2NH_3^+][^-N(SO_2CF_3)_2]$
$[C_{12}H_{25}N^+(CH_3)(CH_2CH_2O)_mH(CH_2CH_2O)_nH][^-O_3SC_6H_4CF_3]$; (m+n=15)
$[C_{12}H_{25}N^+(CH_3)(CH_2CH_2O)_mH(CH_2CH_2O)_nH][^-O_3SC_6F_5]$; (m+n=15)
$[C_{12}H_{25}N^+(CH_3)(CH_2CH_2O)_mH(CH_2CH_2O)_nH][^-O_3SC_6F_4SO_3^-]$; (m+n=15)

Preferred antistats for polymer melt additive applications are quaternary ammonium salts and include those having cations selected from the group consisting of $C_{12}H_{25}N^+(CH_3)[(CH_2CH_2O)_mH][(CH_2CH_2O)_nH];$
(m+n=15)

$C_{18}H_{37}N^+(CH_3)[(CH_2CH_2O)_mH][(CH_2CH_2O)_nH];$
(m+n=15)

$C_{12}H_{25}N^+(CH_3)[(CH_2CH_2O)_mH][(CH_2CH_2O)_nH];$
(m+n=5), and $C_{12}H_{25}N^+(CH_3)_2(CH_2CH_2O)_mH];$ m=15 and having organic or fluoroorganic anions (preferably, anions selected from the group consisting of alkane sulfonates, aryl sulfonates, alkaryl sulfonates, perfluoroalkanesulfonates, bis(perfluoroalkanesulfonyl) imides, and tris(perfluoroalkanesulfonyl)methides; more preferably, alkane sulfonates, perfluoroalkanesulfonates, and bis(perfluoroalkanesulfonyl)imides); most preferably, perfluoroalkanesulfonates and bis(perfluoroalkanesulfonyl) imides, with the imides being especially preferred).

Fluorochemical Repellents

Suitable fluorochemical repellency-imparting additives or repellents for use in the composition of the invention are those that comprise at least one fluorochemical group, preferably, at least one fluoroaliphatic or fluoroalicyclic group. These fluorochemicals include any of the fluorochemical group-containing polymeric and oligomeric compounds known in the art to impart water and oil repellency to substrates. These polymeric and oligomeric fluorochemicals typically comprise one or more fluorochemical groups that contain a perfluorinated carbon chain having from 3 to about 20 carbon atoms, more preferably from about 4 to about 12 carbon atoms. These fluorochemical groups can contain straight chain, branched chain, or cyclic fluorinated alkylene groups or any combination thereof. The fluorochemical groups can optionally contain catenated (i.e., in-chain) heteroatoms such as oxygen, divalent or hexavalent sulfur, or nitrogen. Fully-fluorinated groups are preferred, but hydrogen or chlorine atoms can also be present as substituents, provided that no more than one atom of either is present for every two carbon atoms. It is additionally preferred that any fluorochemical group contain at least about 40% fluorine by weight, more preferably at least about 50% fluorine by weight. The terminal portion of the group is generally fully-fluorinated, preferably containing at least 7 fluorine atoms, e.g., $CF_3CF_2CF_2-$, $(CF_3)_2CF-$, $SF_5CF_2-$. Perfluorinated alkyl groups (i.e., those of the formula $C_nF_{2n+1}-$) are the most preferred fluorochemical groups.

Representative examples of suitable fluorochemicals include fluorochemical urethanes, ureas and substituted ureas, esters, ethers, alcohols, epoxides, allophanates, amides, amines (and salts thereof), acids (and salts thereof), carbodiimides, guanidines, oxazolidinones, isocyanurates, piperazines, aminoalcohols, sulfones, imides, biurets, acrylate and methacrylate homopolymers and copolymers, siloxanes, alkoxysilanes, chlorosilanes, and mixtures thereof.

Representative fluorochemical group-containing polymers useful in the present invention include fluorochemical acrylate and methacrylate homopolymers or copolymers containing fluorochemical acrylate monomers interpolymerized with monomers such as methyl methacrylate, butyl acrylate, octadecylmethacrylate, acrylate and methacrylate esters of oxyalkylene and polyoxyalkylene polyol oligomers (e.g., oxyethylene glycol dimethacrylate, polyoxyethylene glycol dimethacrylate, methoxy acrylate, and polyoxyethylene acrylate), glycidyl methacrylate, ethylene, butadiene, styrene, isoprene, chloroprene, vinyl acetate, vinyl chloride, vinylidene chloride, vinylidene fluoride, acrylonitrile, vinyl chloroacetate, vinylpyridine, vinyl alkyl ethers, vinyl alkyl ketones, acrylic acid, methacrylic acid, 2-hydroxyethylacrylate, N-methylolacrylamide, 2-(N,N,N-trimethylammonium)ethyl methacrylate, and 2-acrylamido-2-methylpropanesulfonic acid (AMPS). The relative amounts of various comonomers used can generally be selected empirically, depending on the substrate to be treated, the properties desired, and the mode of application to the substrate. Useful fluorochemicals also include blends of the various fluorochemicals described above.

Also useful in the present invention are blends of fluorochemicals with fluorine-free extender compounds, such as siloxanes, (meth)acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensates of fatty acids with polyamides and their epichlorohydrin adducts, waxes, polyethylene, chlorinated polyethylene, alkyl ketene dimers, esters, and amides. Blends of these fluorine-free extender compounds can also be used.

Many fluorochemicals, including blends that include fluorine-free extender molecules such as those described above, are commercially available as ready-made formulations. These products are sold, for example, as SCOTCHGUARD™ Carpet Protector (manufactured by Minnesota Mining and Manufacturing Company, Saint Paul, Minn.) and as ZONYL™ Carpet Treatment (manufactured by E.I. du Pont de Nemours and Company, Wilmington, Del.).

Some useful fluorochemicals are described in European Patent No. 0 613 462 (Minnesota Mining and Manufacturing Company) and in U.S. Pat. No. 3,728,151 (Sherman et al.), U.S. Pat. No. 3,816,229 (Bierbrauer), U.S. Pat. No. 3,896,035 (Schultz et al.), U.S. Pat. No. 3,901,727 (Loudas), U.S. Pat. No. 3,916,053 (Sherman et al.), U.S. Pat. No. 4,043,923 (Loudas), U.S. Pat. No. 4,043,964 (Sherman et al.), U.S. Pat. No. 4,264,484 (Patel), U.S. Pat. No. 4,624,889 (Bries), U.S. Pat. No. 5,274,159 (Pellerite et al.), U.S. Pat. No. 5,380,778 (Buckanin), and U.S. Pat. No. 5,451,622 (Boardman et al.), the descriptions of which are incorporated herein by reference.

Fluorochemical repellents suitable for use as polymer melt additives are preferably stable at temperatures of 240° C. and above (more preferably, 280° C. and above), are preferably miscible with the insulating material at the melt processing temperature, and are preferably capable of migration to the surface of the insulating material. Thus, a preferred class of fluorochemical repellents, useful both in topical treatments and as polymer melt (or other bulk polymer) additives, includes fluorochemical oxazolidinone compositions or fluorochemical oxazolidinones comprising normally solid, water-insoluble, fluoroaliphatic radical-containing 2-oxazolidinone compounds, the compounds comprising one or more 2-oxazolidinone moieties,

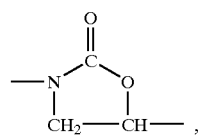

at least one of which has a monovalent fluoroaliphatic radical, $R_f$, bonded to the 5-position carbon atom thereof by an organic linking group.

A preferred subclass of these fluoroaliphatic radical-containing oxazolidinone compounds is that represented below:

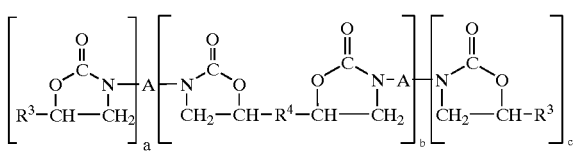

where each $R^3$ is independently hydrogen or an organic radical, where the organic radical can contain -Q-$R_f$ where Q is a linking group and $R_f$ is a fluoroaliphatic radical that can optionally contain one or more catenated (in-chain) heteroatom such as oxygen; each $R^4$ is independently an organic radical, where the organic radical can contain -Q-$R_f$ where Q and $R_f$ are as defined above; with the proviso that there is at least one $R_f$ radical in one of $R^3$ and $R^4$; each A is independently an organic radical; a is zero or 1; b is a number from 0 to about 6; c is 0, 1, or 2; and the sum of a+b+c is at least 1. Preferably, $R^3$ is an organic radical that contains -Q$R_f$, where $R_f$ is a perfluoroalkyl group having from about 3 to about 20 carbon atoms (preferably, from about 4 to about 12 carbon atoms), and Q comprises a heteroatom-containing group, an organic group, or a combination thereof (preferably, Q is —$SO_2N(R')(CH_2)_k$—, —$(CH_2)_k$—, —$CON(R')(CH_2)_k$—, or —$(CH_2)_kSO_2N(R')$ $(CH_2)_k$—, where R' is hydrogen, phenyl, or a short chain (up to about 6 carbon atoms) alkyl group (preferably, methyl or ethyl), and each k is independently an integer from 1 to about 20); a is 1; b is 0; c is 0; and A is an alkyl group having from about 12 to about 22 carbon atoms. This preferred subclass represents individual compounds or mixtures of compounds, for example, as they are obtained as products from reactions used in their preparation.

These fluorochemical oxazolidinone compositions can be prepared using known organic reactions, for example, by the reaction of epoxides or halohydrins (for example, chlorohydrins or bromohydrins) with organic isocyanates in each which reaction at least one of the reactants contains an $R_f$ radical. The reactions can be carried out stepwise by reacting the halohydrin with the isocyanate under urethane bond-forming conditions, for example, 20° C. to 100° C. for about 1 to 24 hours, to form a urethane intermediate, followed by addition of a base and reaction at about 20° C. to 100° C. for about 1 to 24 hours to form the oxazolidinone composition. Alternatively, an epoxide can be reacted with an isocyanate in the presence of a catalyst, such as diethyl zinc, to form the oxazolidinone directly.

Suitable fluorochemical oxazolidinones and methods for their preparation are further described in U.S. Pat. Nos. 5,025,052 and 5,099,026 (Crater et al.), the descriptions of which are incorporated herein by reference.

Other fluorochemical repellents, useful both in topical treatments and as polymer melt (or other melt blend) additives, include those described in U.S. Pat. No. 3,899,563 (Oxenrider et al.), U.S. Pat. No. 4,219,625 (Mares et al.), U.S. Pat. No. 5,560,992 (Sargent et al.), and U.S. Pat. No. 5,681,963 (Liss); International Patent Publication Nos. WO 97/22576, WO 97/22659, and WO 97/22660 (E. I. du Pont de Nemours and Company); Japanese Patent Publication Nos. 3-041160 (Kao Corporation) and 9-323956 (Wako Junyaku Kogyo Co.); and International Patent Publication No. WO 99/05345 (Minnesota Mining and Manufacturing Company), the descriptions of which are incorporated herein by reference.

Of these, particularly preferred are the fluorochemical group-containing derivatives having a long-chain (preferably, having at least about 30 carbon atoms; more preferably, dimer and trimer, as defined below) acids, alcohols, and amines. A preferred class of these derivatives includes the compounds or mixtures of compounds represented by the formulas:

$\{(R_f)_n\text{-Q-O—C(O)}\}_p\text{-A}$ $\{(R_f)_n\text{-Q-C(O)—O}\}_p\text{-A'}$ $\{(R_f)_n\text{-Q-N(R)—C(O)}\}_p\text{-A}$ $\{(R_f)_n\text{-Q-C(O)—N(R)}\}_p\text{-A'}$ wherein $R_f$ is a fluorinated alkyl group (which can optionally contain one or more catenated (in-chain) heteroatoms such as oxygen) bonded through carbon; n is 1 or 2; Q is a divalent or trivalent linking group or a covalent bond; p is 2 or more, up to the valency of A or A'; R is a hydrogen atom or is a substituted or unsubstituted alkyl group; A is the residue of a dimer or trimer acid; and A' is the residue of a dimer diol, a dimer diamine, a trimer triol, or a trimer triamine. Preferably, $R_f$ is a perfluoroalkyl group having from about 3 to about 20 carbon atoms (preferably, from about 4 to about 12 carbon atoms); R is an alkyl group having from 1 to about 6 carbon atoms; Q is —$SO_2N(R')$ $(CH_2)_k$—, —$(CH_2)_k$—, —$CON(R')(CH_2)_k$—, or —$(CH_2)_k$ $SO_2N(R')(CH_2)_k$—, where R' is hydrogen, phenyl, or a short chain (up to about 6 carbon atoms) alkyl group (preferably, methyl or ethyl), and each k is independently an integer from 1 to about 20; A is the residue of a dimer acid; and A' is the residue of a dimer diol or dimer diamine. The esters and "reverse" esters are preferred over the amides and "reverse" amides.

These fluorochemical group-containing dimer and trimer acid esters can be prepared by heating a fluorochemical alcohol with either a dimer acid or a trimer acid in the presence of a standard acid catalyst, or by first making an acid chloride of the dimer/trimer acid and then reacting the acid chloride with a fluorochemical alcohol at a slightly elevated temperature (for example, 50–60° C.) in the presence of an acid scavenger. Fluorochemical group-containing "reverse" esters can be prepared by reacting a fluorochemical carboxylic acid with a dimer diol, using the same synthetic procedure as described for preparing esters. Fluorochemical group-containing amides can be prepared by reacting a fluorochemical amine with a dimer or trimer acid by heating the components together neat at an elevated temperature (at least about 220° C.), or by first making an acid chloride of the dimer/trimer acid and then reacting the acid chloride with a fluorochemical amine at a slightly elevated temperature. Fluorochemical group-containing "reverse" amides can be prepared by reacting a fluorochemical carboxylic acid with a dimer amine, using the same synthetic procedure as described for preparing esters.

The terms "dimer acid" and "trimer acid" refer to oligomerized unsaturated fatty acid products of relatively high molecular weight. The products are mixtures comprising various ratios of a variety of large or relatively high molecular weight substituted cyclohexenecarboxylic acids, predominately 36-carbon dibasic acids (dimer acid) and 54-carbon tribasic acids (trimer acid), with no single structure sufficient to characterize each. Component structures can be acyclic, cyclic (monocyclic or bicyclic), or aromatic.

Dimer and trimer acids (for use in preparing the above-described fluorochemical repellents) can be prepared by condensing unsaturated monofunctional carboxylic acids such as oleic, linoleic, soya, or tall oil acid through their olefinically unsaturated groups, in the presence of catalysts such as acidic clays. Dimer/trimer acids are commercially available from a variety of vendors, including Henkel Corporation/Emery Group (as EMPOL™ 1008, 1061, 1040 and 1043) and Unichema North America (as PRIPOL™ 1004 and 1009). Dimer diols and diamines can be made from the corresponding dimer acid by methods well known in the art. Dimer diols are commercially available from Henkel Corp./Emery Group as EMPOL™ 1070 and 1075 diols. Dimer amines are commercially available from Witco Corp., for example, as KEMAMINE™ DP-3695 amine.

Insulating Materials

The compositions of the present invention can be used with various insulating materials provided these compositions are compatible with the insulating material. Thus, the compositions of the present invention preferably perform well as an antistat and a repellent and do not adversely affect the other properties of the insulating material.

The compositions of the present invention can be topically applied from aqueous or organic solvents (or binders) to a variety of insulating materials including photographic or x-ray film, x-ray screens, fabric, fibers, electronic components, electronic packaging, compact discs, molded or blown objects, and the like. The choice of solvent varies with the insulating material.

Insulating materials that are suitable for topical treatment include materials that have relatively low surface and bulk conductivity and that are prone to static charge build-up. These materials include both synthetic and naturally occurring polymers (or the reactive precursors thereof, for example, mono- or multifunctional monomers or oligomers) that can be either organic or inorganic in nature, as well as ceramics, glasses, and ceramic/polymer composites, ceramers, or the reactive precursors thereof.

Insulating materials that are suitable for blending with antistatic agents and fluorochemical repellents of the present invention include thermoplastics, thermosets, ceramers, or reactive precursors. The blended compositions may be used in film, fabric, fibers, electronic components, electronic packaging, compact discs, molded or blown objects, and the like.

Suitable synthetic polymers (which can be either thermoplastic or thermoset) include commodity plastics such as, for example, poly(vinyl chloride), polyethylenes (high density, low density, very low density), polypropylene, polybutylene, and polystyrene; engineering plastics such as, for example, polyesters (including, for example, poly (ethylene terephthalate) and poly(butylene terephthalate), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allylics (for example, polymers derived from allyldiglycolcarbonate), fluoroelastomers, and polyacrylates; and the like and blends thereof. Suitable naturally occurring polymers include proteinaceous materials such as silk, wool, and leather; and cellulosic materials.

Thermoplastic and thermoset polymers, including those described above, are preferred insulating materials, as these polymers can either be topically treated with the antistat/repellent combination or can be combined with it (in bulk) to form a blend. Melt processing of the composition into a thermoplastic polymer is preferred because it eliminates the use of hazardous solvents and VOCs. Preferably, the thermoplastic polymers are melt processable at elevated temperatures, for example, above about 150° C. (more preferably, above about 240° C.; even more preferably, above about 280° C.). Preferred thermoplastic polymers include, for example, polypropylene, polyethylene, polybutylene, copolymers of ethylene and one or more alpha-olefins (for example, poly(ethylene-butene) and poly (ethylene-octene)), polyesters, polyurethanes, polycarbonates, polyetherimides, polyimides, polyetherketones, polysulfones, polystyrenes, ABS copolymers, polyamides, fluoroelastomers, and blends thereof. More preferred are polypropylene, polyethylene, polybutylene, polyesters, poly(ethylene-octene), poly (ethylene-butene), polyurethanes, polycarbonates, and blends thereof, with polypropylene, polyethylene, poly (ethylene-octene), polyurethanes, and blends thereof being most preferred.

The composition of the present invention can also be combined with monomers, curable oligomers, or polymers followed by polymerization or curing to form a crosslinked thermoset polymer containing the composition. Preferred thermoset polymers include polyurethane, epoxy resins, and unsaturated polyesters.

The composition of the present invention can further be applied to an insulating material using techniques known in the art such as, but not limited to, dip coating, spray coating, swirl coating, spin coating, extrusion, hopper coating, curtain coating, gravure coating, air knife coating, and the like. The coating thickness varies as a function of the insulating material.

Preparation and Use of Composition

Preferably, the composition of the invention can be prepared by (a) combining at least one antistat, at least one fluorochemical repellent, and at least one thermoplastic polymer (optionally, along with other additives) and then melt processing the resulting combination; or (b) combining at least one antistat, at least one fluorochemical repellent, and at least one thermosetting polymer or ceramer or the reactive precursors thereof (optionally, along with other additives) and then allowing the resulting combination to cure, optionally with the application of heat or actinic radiation. Alternative processes for preparing the composition include, for example, (c) applying a topical treatment composition comprising at least one antistat and at least one fluorochemical repellent to at least a portion of at least one surface of at least one insulating material; (d) dissolving at least one antistat, at least one fluorochemical repellent, and at least one insulating material in at least one solvent and then casting or coating the resulting solution or topical treatment and allowing evaporation of the solvent, optionally with the application of heat; and (e) combining at least one antistat, at least one fluorochemical repellent, and at least one monomer or curable oligomer (optionally, along with other additives) and then allowing polymerization of the monomer(s) or curable oligomer(s) to occur, and optionally applying heat or actinic radiation. If desired, the antistat and repellent can be applied separately, for example, one can be added prior to melt processing, and the other can then be topically applied to the resulting melt-processed combination. Separate topical treatments, etc., are also possible.

To form a melt blend by melt processing, the antistat(s) and fluorochemical repellent(s) can be, for example, intimately mixed with pelletized or powdered polymer and then melt processed by known methods such as, for example, molding, melt blowing, melt spinning, or melt extrusion. The antistat and repellent additives can be mixed directly with the polymer or they can be mixed with the polymer in the form of a "master batch" (concentrate) of the additives in the polymer. If desired, an organic solution of the additives can be mixed with powdered or pelletized polymer, followed by drying (to remove solvent) and then by melt processing. Alternatively, the additives can be injected into a molten polymer stream to form a blend immediately prior to, for example, extrusion into fibers or films or molding into articles.

After melt processing, an annealing step can be carried out to enhance the development of antistatic and repellent characteristics. In addition to, or in lieu of, this annealing step, the melt processed combination (for example, in the form of a film or a fiber) can also be embossed between two heated rolls, one or both of which can be patterned. An annealing step typically is conducted below the melt temperature of the polymer (for example, in the case of polyamide, at about 100–220° C. for a period of about 30 seconds to about 5 minutes). In some cases, the presence of moisture can improve the effectiveness of the antistat(s), although the presence of moisture is not necessary in order for antistatic characteristics to be obtained.

The antistat(s) and fluorochemical repellent(s) can be added to thermoplastic or thermosetting polymers (or, alternatively, to other insulating materials) in amounts sufficient to achieve the desired antistatic and repellency properties for a particular application. The amounts can be determined empirically and can be adjusted as necessary or desired to achieve the antistatic and repellency properties without compromising the properties of the polymer (or other insulating material). Generally, the antistat(s) and the fluorochemical repellent(s) can each be added in amounts ranging from about 0.1 to about 10 percent by weight (preferably, from about 0.5 to about 2 percent; more preferably, from about 0.75 to about 1.5 percent) based on the weight of polymer (or other insulating material).

In topical treatment of an insulating material, the combination of antistat(s) and fluorochemical repellent(s) can be employed alone or in the form of aqueous suspensions, emulsions, or solutions, or as organic solvent (or organic solvent/water) solutions, suspensions, or emulsions. Useful organic solvents include chlorinated hydrocarbons, alcohols (for example, isopropyl alcohol), esters, ketones (for example, methyl isobutyl ketone), and mixtures thereof. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 10 percent, by weight (based on the total weight of the components). Alternatively, however, topical treatment can be carried out by applying (to at least a portion of at least one surface of at least one insulating material) a topical treatment composition that comprises at least one antistat that is liquid at the use or treatment temperature. This topical treatment process can involve the use of the neat liquid antistat(s), without added solvent, and is thus preferred from an environmental perspective over the use of organic solvent solutions of the antistat/repellent combination(s).

The topical treatment compositions comprising the antistat/repellent combination(s) can be applied to an insulating material by standard methods such as, for example, spraying, padding, dipping, roll coating, brushing, or exhaustion (optionally followed by the drying of the treated material to remove any remaining water or solvent). The material can be in the form of molded or blown articles, sheets, fibers (as such or in aggregated form, for example, yarn, toe, web, or roving, or in the form of fabricated textiles such as carpets), woven and nonwoven fabrics, films, etc. If desired, the antistat/repellent combination can be co-applied with conventional fiber treating agents, for example, spin finishes or fiber lubricants.

The topical treatment compositions can be applied in an amount sufficient to achieve the desired antistatic and repellency properties for a particular application. This amount can be determined empirically and can be adjusted as necessary or desired to achieve the antistatic and repellency properties without compromising the properties of the insulating material.

Any of a wide variety of constructions can be made from the composition of the invention, and these constructions will find utility in any application where some level of antistatic and repellency characteristics is required. For example, the composition of the invention can be used to prepare films and molded or blown articles, as well as fibers (for example, melt-blown or melt-spun fibers, including microfibers) that can be used to make woven and nonwoven fabrics. These films, molded or blown articles, fibers, and fabrics exhibit antistatic and water and oil repellency (and soil resistance) characteristics under a variety of environmental conditions and can be used in a variety of applications.

For example, molded articles comprising the composition of the invention can be prepared by standard methods (for example, by high temperature injection molding) and are particularly useful as, for example, headlamp covers for automobiles, lenses (including eyeglass lenses), casings or circuit boards for electronic devices (for example, computers), screens for display devices, windows (for example, aircraft windows), and the like. Films comprising the composition of the invention can be made by any of the film making methods commonly employed in the art. These films can be nonporous or porous (the latter including films that are mechanically perforated), with the presence and degree of porosity being selected according to the desired performance characteristics. The films can be used as, for example, photographic films, transparency films for use with overhead projectors, tape backings, substrates for coating, and the like.

Fibers comprising the composition of the invention can be used to make woven or nonwoven fabrics that can be used, for example, in making medical fabrics, medical and industrial apparel, fabrics for use in making clothing, home furnishings such as rugs or carpets, and filter media such as chemical process filters or respirators. Nonwoven webs or fabrics can be prepared by processes used in the manufacture of either melt-blown or spunbonded webs. For example, a process similar to that described by Wente in "Superfine Thermoplastic Fibers," Indus. Eng'g Chem. 48, 1342 (1956) or by Wente et al. in "Manufacture of Superfine Organic Fibers," Naval Research Laboratories Report No. 4364 (1954) can be used. Multi-layer constructions made from nonwoven fabrics enjoy wide industrial and commercial utility, for example, as medical fabrics. The makeup of the constituent layers of these multi-layer constructions can be varied according to the desired end-use characteristics, and the constructions can comprise two or more layers of melt-blown and spunbonded webs in many useful combinations such as those described in U.S. Pat. No. 5,145,727

(Potts et al.) and U.S. Pat. No. 5,149,576 (Potts et al.), the descriptions of which are incorporated herein by reference. In multi-layer constructions, the antistat(s) and fluorochemical repellent(s) can be used in combination in one or more layers, or each can be independently segregated in one or more layers. For example, in a spunbonded/melt-blown/spunbonded ("SMS") three-layer construction, the antistat(s) can be used in one or both spunbonded layers, and the fluorochemical repellent(s) can be used in the melt-blown layer, to impart both antistatic and repellency characteristics to the overall construction.

The antistat(s) and fluorochemical repellent(s) used in the composition of the invention can also find utility as additives to coatings (for example, polymer or ceramer coatings). These coatings can be antistatic, water- and oil-repellent, and scratch-resistant (as well as soil-resistant) and can be used in the photographic industry or as protective coatings for optical or magnetic recording media.

If desired, the composition of the invention can further contain one or more conventional additives commonly used in the art, for example, dyes, pigments, antioxidants, ultra-violet stabilizers, flame retardants, surfactants, plasticizers, tackifiers, fillers, and mixtures thereof. In particular, performance enhancers (for example, polymers such as polybutylene) can be utilized to improve the antistatic and/or repellency characteristics in, for example, melt additive polyolefin applications.

EXAMPLES

The present invention will be further described with reference to the following non-limiting examples and test methods. All parts, percentages, and ratios are by weight unless otherwise specified.

TABLE 1

Table of Components

| COMPONENT | DESCRIPTION | AVAILABLE FROM/PREPARATION |
|---|---|---|
| Bis(trifluoromethanesulfonyl)imide | $HN(SO_2CF_3)_2$ | See preparation of Antistat 8 |
| Dimethyl Sulfate | $(CH_3O)_2SO_2$ | Sigma-Aldrich, Milwaukee, Wisconsin |
| EMPOL™ 1008 Acid | A distilled and hydrogenated dimmer acid based on oleic acid, having an acid equivalent weight of 305 as determined by titration | Henkel Corp./Emergy Group Cincinnati, Ohio |
| Epichlorohydrin | ClCH2CH—CH2 (epoxide) | Sigma-Aldrich |
| ETHOQUAD™ C/25 | $[C_{12}H_{25}N^+(CH_3)(CH_2CH_2O)_mH(CH_2CH_2O)^+H^-Cl]$ (m + n = 15) | Akzo Nobel Surface Chemistry LLC, Chicago, Illinois |
| ETHOQUAD™ 18/25 | $[C_{18}H_{37}N^+(CH_3)(CH_2CH_2O)_mH(CH_2CH_2O)_nH^-Cl]$ (m + n = 15) | Akzo Nobel Surface Chemistry LLC |
| ETHOMEEN™ C/15 | $[C_{12}H_{25}N(CH_2CH_2O)_mH(CH_2CH_2O)_nH](m + n = 15)$ | Akzo Nobel Surface Chemistry LLC |
| FLUORAD™ FC-94 | Lithium Perfluorooctanesulfonate | Prepared essentially according to U.S. Pat. No. 2,732,398 (Example 5) with the exception that $CH_3(CH_2)_7SO_2Cl$ was replaced with $CH_3(CH_2)_7SO_2F$ as the starting material and 50% aqueous KOH was replaced with 50% aqueous LiOH. |
| HQ-115™ | $LiN(SO_2CF_3)_2$ | Minnesota Mining and Manufacturing Company (3M), St. Paul, MN |
| Huntsman XJT-506 | $CH_3(OCH_2CH_2)_{19}(OCH_2CHCH_3)_2NH_2$ | Huntsman, Houston, TX |
| Isopropyl alcohol | $CH_3CH(OH)CH_3$ | Sigma-Aldrich |
| Lithium nonaflate | Lithium nonafluorobutanesulfonate | 3M |
| Lithium triflate | Lithium trifluoromethanesulfonate (FLUORAD™ FC 122) | 3M |
| MeFOSE Alcohol | $C_8F_{17}SO_2N(CH_3)CH_2CH_2OH$ | Prepared using a procedure similar to that described in Example 1 of U.S. Pat. No. 2,803,656 (Ahlbrecht et al.), but replacing N-propyl amine with methyl amine. |
| MEK | Methyl ethyl ketone; 2-Butanone; $CH_3C(O)C_2H_5$ | Sigma-Aldrich |
| Methylene chloride | Dichloromethane; $CH_2Cl_2$ | Sigma-Aldrich |
| N-Methylperfluorooctylsulfonamide | | |
| $NaHCO_3$ | Sodium hydrogencarbonate | Sigma-Aldrich |
| Octadecyl isocyanate | $CH_3(CH_2)_{17}NCO$ | Sigma-Aldrich |
| p-Toluenesulfonic Acid | $CH_3C_6H_4SO_3H$ | Sigma-Aldrich |
| PBSF | Perfluorobutanesulfonyl fluoride | 3M |
| PE6806 | ASPUN™ 6806 polyethylene, having a melt flow index of 105 | Dow Chemical Co. Midland, Michigan |
| PP3960 | FINA™ 3960 polypropylene, melt flow index about 400 | FINA Oil & Chemical Co. LaPorte, Texas |

TABLE 1-continued

Table of Components

| COMPONENT | DESCRIPTION | AVAILABLE FROM/PREPARATION |
| --- | --- | --- |
| PRIPOL™ 1048 Acid | A hydrogenated distilled dimer/trimer acid based on oleic acid | Unichema North America Chicago, Illinois |
| PS440-200 | MORTHANE™ PS440-200 urethane | Morton Thiokol Corp. Chicago, Illinois |

Test Methods

Test Method I
Thermal Gravimetric Analysis (TGA)

The thermal decomposition of each salt was determined by thermal gravimetric analysis (TGA) under an inert nitrogen atmosphere using a 10° C. per minute temperature ramp using a PerkinElmer Thermogravimetric Analyzer TGA 7, manufactured by PerkinElmer Instruments of Norwalk, Conn.

Test Method II
Static Charge Dissipation Test

The static charge dissipation characteristics of nonwoven fabrics, films, and molded sheets were determined using this method. The test materials were cut into 9 cm by 12 cm samples and conditioned at relative humidities (RH) of about 10 percent, 25 percent, and 50 percent for at least 12 hours. The materials were tested at temperatures that ranged from 22–25° C. The static charge dissipation time was measured according to Federal Test Method Standard 10113, Method 4046, "Antistatic Properties of Materials", using an ETS Model 406C. Static Decay Test Unit (manufactured by Electro-Tech Systems, Inc., Glenside, Pa.). This apparatus induces an initial static charge (Average Induced Electrostatic Charge) on the surface of the flat test material by using high voltage (5000 volts), and a field meter allows observation of the decay time of the surface voltage from 5000 volts (or whatever the induced electrostatic charge was) to 10 percent of the initial induced charge. This is the static charge dissipation time. The lower the static charge dissipation time, the better the antistatic properties are of the test material. All reported values of the static charge dissipation times in this invention are averages (Average Static Decay Rate) over at least 3 separate determinations. Values reported as >60 seconds indicate that the sample tested has an initial static charge that cannot be removed by surface conduction and is not antistatic. When the sample tested did not accept a charge of about 3000 volts or more, it was not considered to have charged sufficiently to be antistatic. Samples were tested in order of decreasing relative humidity. If the value of the Average Static Decay Rate had a reported value of >60, testing of samples conditioned at lower relative humidities were discontinued.

Test Method III
Water Repellency Test

Nonwoven web samples were evaluated for water repellency using 3M Water Repellency Test V for Floor coverings (February 1994), available from 3M. In this test, samples are challenged to penetrations by blends of deionized water and isopropyl alcohol (IPA). Each blend is assigned a rating number as shown below:

| Water Repellency Rating Number | Water/IPA Blend (% by Volume) |
| --- | --- |
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a nonwoven web or film sample is placed on a flat, horizontal surface. Five small drops of water, IPA, or a water/IPA mixture are gently placed at points at least two inches apart on the sample. If, after observing for ten seconds at a 45° angle, four of the five drops are visible as a sphere or a hemisphere, the nonwoven web or film sample is deemed to pass the test. The reported water repellency rating corresponds to the highest numbered water, IPA, or water/IPA mixture for which the nonwoven sample passes the described test.

It is desirable to have a water repellency rating of at least 4, preferably at least 6.

Test Method IV
Oil Repellency Test

Nonwoven web or film samples were evaluated for oil repellency using 3M Oil Repellency Test III (February 1994), available from 3M. In this test, samples are challenged to penetration or droplet spread by oil or oil mixtures of varying surface tensions. Oils and oil mixtures are given a rating corresponding to the following:

| Oil Repellency Rating Number | Oil Composition |
| --- | --- |
| 0 | (fails KAYDOL ™ mineral oil) |
| 1 | KAYDOL ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the nonwoven web or film sample passes the test.

It is desirable to have an oil repellency rating of at least 1, preferably at least 3.

Preparation and Characterization of Antistats for Static Charge Dissipation Testing Antistat 1:

Preparation of $[C_{12}H_{25}N^+(CH_3)(CH_2CH_2O)_mH(CH_2CH_2O)_nH][^-OSO_2CF_3]$; (m+n=15)

A 1 liter flask equipped with a mechanical stirrer was charged with a 72% aqueous solution of lithium triflate (45.18 grams) and 120.0 mL of water. To this stirred solution, 200.0 grams of ETHOQUAD™ C/25 was added via a dropping funnel over 7 minutes. The resulting mixture was stirred at room temperature for 1.5 hours, was transferred to a separatory funnel, and methylene chloride (400 milliliters) was added to extract the desired product. The methylene chloride organic phase was washed with water (150 ml). The organic phase was collected into a 1 L roundbottom and concentrated at 60° C. under aspirator-reduced pressure for 1 hour and then at 110° C. under aspirator-reduced pressure for 1 hour to yield 205.2 g (96% yield) of a brown viscous product. This product was characterized by $^1H$ and $^{13}C$ NMR and by thermal gravimetric analysis (room temperature to decomposition at a temperature ramp rate of 10° C./minutes).

Antistat 2:

Preparation of $[C_{12}H_{25}N^+(CH_3)(CH_2CH_2O)_mH(CH_2CH_2O)_nH][^-N(SO_2CF_3)_2]$; (m+n=15)

A 1 liter flask equipped with a mechanical stirrer was charged with 28.7 grams HQ-115™ and 125.0 grams of water. To this stirred solution, 95.89 grams of ETHOQUAD™ C/25 was added via a dropping funnel, over 16 minutes. The resulting mixture was transferred to a separatory funnel and extracted with 200 grams of methylene chloride. The methylene chloride organic phase was separated from the aqueous phase and washed with 125 mL of water. After washing, the organic phase was placed in a silicone oil bath and distilled at 150° C. for a yield of 108.92 grams (94% yield). The resulting product was characterized by $^1H$ and $^{13}C$ NMR and by thermal gravimetric analysis.

Antistat 3:

Preparation of $[C_{12}H_{25}N^+(CH_3)(CH_2CH_2O)_mH(CH_2CH_2O)_nH][^-O_3SC_4F_9]$; (m+n=15)

Antistat 3 was prepared in a manner similar to the preparation of Antistat 1, except that the 1 liter flask was charged with 30.6 grams of lithium nonaflate and 125.0 grams of water, and 95.89 grams of ETHOQUAD™ C/25 were added over 15 minutes, followed by extraction with 200 grams methylene chloride. The organic phase produced a yield of 109.96 grams (93% yield) of product that was characterized by $^1H$ and $^{13}C$ NMR and by thermal gravimetric analysis.

Antistat 4:

Preparation of $[C_{18}H_{37}N^+(CH_3)(CH_2CH_2O)_mH(CH_2CH_2O)_nH][^-O_3SCF_3]$; (m+n=15)

Antistat 4 was prepared in a manner similar to the preparation of Antistat 1 except that the 1 liter flask was charged with 13.43 grams of a 72% solids aqueous solution of lithium triflate and 125 grams of water, and 65 grams of ETHOQUAD™ 18/25 was added over 15 minutes, followed by extraction with 200 grams methylene chloride. The organic phase produced a yield of 63.77 grams (92.8% yield) of product that was characterized by $^1H$ and $^{13}C$ NMR and by thermal gravimetric analysis.

Antistat 5:

Preparation of $[C_{18}H_{37}N^+(CH_3)(CH_2CH_2O)_mH(CH_2CH_2O)_nH][^-N(SO_2CF_3)_2]$; (m+n=15)

Antistat 5 was prepared in a manner similar to the preparation of Antistat 1 except that the 1 liter flask was charged with 17.79 grams of HQ-115™ and 125.0 grams of water and 65 grams of ETHOQUAD™ 18/25 were added over 15 minutes, followed by extraction with 200 grams methylene chloride. The organic phase produced a yield of 74.44 grams (96.9% yield) of product that was characterized by $^1H$ and $^{13}C$ NMR and by thermal gravimetric analysis.

Antistat 6:

Preparation of $[C_{18}H_{37}N^+(CH_3)(CH_2CH_2O)_mH(CH_2CH_2O)_nH][^-O_3SC_4F_9]$; (m+n=15)

Antistat 6 was prepared in a manner similar to the preparation of Antistat 1 except that the 1 liter flask was charged with 18.97 grams of lithium nonaflate and 125.0 grams of water and 65 grams of ETHOQUAD™ 18/25 were added over 17 minutes, followed by extraction with 200 grams methylene chloride. The organic phase produced a yield of 72.61 grams (93.1% yield) of product that was characterized by $^1H$ and $^{13}C$ NMR and by thermal gravimetric analysis.

Antistat 7:

Preparation of $[C_{12}H_{25}N^+(CH_3)(CH_2CH_2O)_mH(CH_2CH_2O)_nH][^-O_3SCF_3]$; (m+n=5)

ETHOMEEN™ C/15 (100 grams) was charged to a 250 mL 3-neck roundbottom flask, equipped with a mechanical stirrer, along with of $NaHCO_3$ (3 grams). The flask was purged with nitrogen for several minutes, placed in a silicone oil bath, and heated to 110° C. Dimethylsulfate (30.76 grams) was added to the roundbottom flask via a dropping funnel at a rate that kept the temperature at 110° C. (+/−3° C.). The reaction was stirred overnight, ultimately producing $[C_{12}H_{25}N(CH_3)(CH_2CH_2O)_mH(CH_2CH_2O)_nH^+][^-O_3SOCH_3]$; (m+n=5).

Antistat 7 was prepared in a manner similar to the preparation of Antistat 1 except that a 500 mL flask was charged with 65 grams of $[C_{12}H_{25}N(CH_3)(CH_2CH_2O)_mH(CH_2O)_nH^+][^-O_3SOCH_3]$; (m+n=5), 18.88 grams of isopropyl alcohol, and 60.9 grams of water and 26.22 grams of lithium triflate (MW 216.67) was added. The mixture was then extracted with 100 grams of methylene chloride and washed with 60.9 mL of water. The organic phase produced a yield of 59.95 grams of product that was characterized by $^1H$ and $^{13}C$ NMR and by thermal gravimetric analysis.

Antistat 8:

Preparation of $[CH_3(OCH_2CH_2)_{19}(OCH_2CHCH_3)_2NH_3^+][^-N(SO_2CF_3)_2]$ (i) Preparation of bis(trifluoromethanesulfonyl)imide: $HN(SO_2CF_3)_2$ A 50% aqueous solution of HQ-115™ was placed in glass dishes and dried overnight in an oven at 120° C. This dried material (2276.6 g) was placed in a 5 liter 3 necked roundbottom flask equipped with magnetic stir bar and distillation head with warm water flowing through it. Then sulfuric acid (98%; 4482.2 g) was slowly added to the roundbottom flask. Upon heating the roundbottom flask, distillates were collected in a receiving flask. At a temperature of about 105° C. and a pressure of about 75 mm Hg (10 kPa), a first fraction was collected (84.4 g). Next, the receiving flask was changed and a second fraction was collected under the same temperature and pressure. This fraction was a clear liquid, solidifying at room temperature of $HN(SO_2CF_3)_2$ (1981 g; 88.9% yield; melting point about 40° C.).

(ii) Preparation of $[CH_3(OCH_2CH_2)_{19}(OCH_2CHCH_3)_2NH_3^+][^-N(SO_2CF_3)_2]$ A 2 necked 250 mL roundbottom flask equipped with nitrogen inlet adaptor and magnetic stir bar was charged with Huntsman XJT-506 (25.5 g). Next, bis(trifluoromethanesulfonyl)imide (7.03 g) was added from a dropping funnel. After 10 minutes of stirring, 29.96 g (91.7% yield) of a light brown syrup of [CH$_3$(OCH$_2$CH$_2$)$_{19}$(OCH$_2$CHCH$_3$)$_2$NH$_3$$^+$][$^-$N(SO$_2$CF$_3$)$_2$] (pH 6) was isolated.

TABLE 2

| ANTISTAT | Wt. % remaining @ given Temp(° C.) | | | |
| --- | --- | --- | --- | --- |
| | 200° C. | 240° C. | 280° C. | 320° C. |
| 1 | 99.5 | 98.9 | 98.4 | 93.4 |
| 2 | 99.7 | 99.5 | 99.3 | 98.6 |
| 3 | 99.9 | 99.9 | 99.5 | 93.0 |
| 4 | 99.2 | 98.5 | 97.8 | 95.8 |
| 5 | 99.6 | 99.2 | 98.9 | 98.0 |
| 6 | 99.3 | 98.7 | 98.2 | 96.5 |
| 7 | 99.6 | 98.7 | 95.3 | 87.8 |
| 8 | 98.5 | 96.9 | 81.3 | 31.6 |
| ETHOQUAD™ C/25 | 97.2 | 89.4 | 85.9 | 81.8 |
| ETHOQUAD™ 18/25 | 97.6 | 90.8 | 85.5 | 82.0 |

Antistats 1, 2, and 3 (with the same ammonium cation as ETHOQUAD™ C/25 (having a chloride counterion), but having fluorochemical counterions) have less weight loss than ETHOQUAD™ C/25 over the processing range of 200–320° C. Likewise, Antistats 4, 5, and 6 (with the same ammonium cation as ETHOQUAD™ 18/25 (having a chloride counterion), but having fluorochemical counterions) have less weight loss than ETHOQUAD™ 18/25 over the processing range of 200–320° C. The greater thermal stability of the compositions of the invention enhances their processability and minimizes evolution of volatile decomposition products.

Preparation of Repellent Additives
Fluorochemical Repellent FR-1

Fluorochemical Repellent FR-1 (a fluorochemical oxazolidinone) was prepared by reacting N-methylperfluorooctylsulfonamide with epichlorohydrin to form the fluorochemical chlorohydrin, C$_8$F$_{17}$SO$_2$N(Me)CH(OH)CH$_2$Cl, which was further reacted with octadecyl isocyanate at a 1:1 molar ratio followed by ring closure. The method followed is outlined in Scheme I of U.S. Pat. No. 5,025,052 (Crater et al.), column 5, lines 11–50.

Fluorochemical Repellent FR-2

Fluorochemical Repellent FR-2 (a fluorochemical ester) was prepared by esterifying MeFOSE alcohol with EMPOL™ 1008 acid at a molar ratio of 2:1 using the following procedure. A 500 mL 2-necked round-bottom flask equipped with overhead stirrer, condenser, thermometer, and Dean-Stark trap wrapped with heating tape was charged with of EMPOL™ 1008 acid (57.8 grams; 0.190 eq), of MeFOSE alcohol (100 grams; 0.185 eq), p-toluenesulfonic acid (1.0 gram) and toluene (50 grams). The flask was placed in an oil bath heated to 150° C. The degree of esterification was monitored by measuring the amount of water collected in the Dean-Stark trap and also by using gas chromatography to determine the amount of unreacted fluorochemical alcohol, MeFOSE. After 18 hours of reaction, about 2.8 mL of water was collected and a negligible amount of fluorochemical alcohol remained, indicating a complete reaction. The reaction mixture was then cooled to 100° C. and was twice washed with 120 mL aliquots of deionized water, the final water wash having a pH of 3. The final wash was removed from the flask by suction, and the reaction mixture was heated to 120° C. at an absolute pressure of about 90 torr to remove volatiles. The resulting product, a brownish solid, was characterized as containing the desired fluorochemical ester by $^1$H, $^{13}$C NMR spectroscopy and thermogravimetric analysis.

General Preparation of Nonwoven Samples

Nonwoven thermoplastic samples described below were prepared on a 1.9 centimeter (cm) Brabender extruder with a 25.4 cm die (C. W. Brabender, Hackensack, N.J.) into blown microfibers with a diameter of less than about 20 microns (described in: Wente, Van A., "Superfine Thermoplastic Fibers", Industrial and Eng. Chemistry, Vol. 48, No. 8, 1956, pp. 1342–1345, and Naval Research Laboratory Report 111437, Apr. 15, 1954). For PP3960 samples, the first extruder zone was set at 160° C., and all other zones were set at 270° C. The die air temperature was set at 275° C., and the melt temperature was recorded at 279° C. For PS440-200 samples, the first extruder zone was set at 162° C., and all other zones were set at 232° C. The die air temperature was set at 230° C., and the melt temperature was recorded at 230° C. For PE6806 samples, the first extruder zone was set at 145° C., and all other zones were set at 230° C. The die air temperature was set at 230° C., and the melt temperature was recorded at 230° C. The metering gear pump speed was set at 70 rpm. The die was configured with an air gap setting of 0.763 millimeter (mm) and a set back of 0.69 mm. With a collector distance of 30.5 cm, the take up speed was set to deliver a melt blown nonwoven formed from the microfibers with a basis weight of 50 grams/m$^2$. The nonwoven samples were tested for water and oil repellency according to Test Methods III and IV. The nonwoven samples were also conditioned at 50% relative humidity (23° C.) and tested for static charge dissipation according to Test Method II.

The effective fiber diameter (EFD) was calculated according to the method set forth in Davies, C. N., "The Separation of Airborne Dust and Particles," Institution of Mechanical Engineers, London, Proceedings 1B, 1952.

Example C1 (Comparative)

Samples were prepared according to General Preparation of Nonwoven Samples using PS 440-200 polyurethane with no antistat or repellent included. Oil and water repellency and static charge dissipation data are listed in Table 3.

Example C2 (Comparative)

Samples were prepared according to General Preparation of Nonwoven Samples using PS 440-200 urethane with 2% FR-1. Oil and water repellency and static charge dissipation data are listed in Table 3.

Example C3 (Comparative)

Samples were prepared according to General Preparation of Nonwoven Samples 1 using PE 6806 polyethylene with no antistat or repellent additives. Oil and water repellency and static charge dissipation data are listed in Table 4.

Example C4 (Comparative)

Samples were prepared according to General Preparation of Nonwoven Samples using PE 6806 polyethylene with 1% FR-1 Oil and water repellency and static charge dissipation data are listed in Table 4.

Example C5 (Comparative)

Samples were prepared according to General Preparation of Nonwoven Samples using PP 3960 polypropylene with no additives. Oil and water repellency and static charge dissipation data are listed in Table 5.

Example C6 (Comparative)

Samples were prepared according to General Preparation of Nonwoven Samples using PP 3960 polypropylene with 1% ETHOQUAD™ C/25. Oil and water repellency and static charge dissipation data are listed in Table 5.

Example C7 (Comparative)

Sample were prepared according to General Preparation of Nonwoven Samples using PP 3960 polypropylene with 1% ETHOQUAD™ 18/25. Oil and water repellency and static charge dissipation data are listed in Table 5.

Example C8 (Comparative)

Sample were prepared according to General Preparation of Nonwoven Samples using PP 3960 polypropylene with 1.0% FR-1. Oil and water repellency and static charge dissipation data are listed in Table 5.

Example C9 (Comparative)

Samples were prepared according to General Preparation of Nonwoven Samples using PP 3960 polypropylene with 1.5% FR-2. Oil and water repellency and static charge dissipation data are listed in Table 5.

Example C10 (Comparative)

Samples were prepared according to General Preparation of Nonwoven Samples using PS 440-200 polyurethane and 2% Antistat 1. Oil and water repellency and static charge dissipation data are listed in Table 3.

Example C11 (Comparative)

Samples were prepared according to General Preparation of Nonwoven Samples using PE 6806 polyethylene and 1% Antistat 1. Oil and water repellency and static charge dissipation data are listed in Table 4.

Example C12 (Comparative)

Samples were prepared according to General Preparation of Nonwoven Samples using PP 3960 polypropylene and 1% Antistat 1. Oil and water repellency and static charge dissipation data are listed in Table 5.

Example C13 (Comparative)

Samples were prepared according to General Preparation of Nonwoven Samples using PP 3960 polypropylene and 0.75% Antistat 1. Oil and water repellency and static charge dissipation data are listed in Table 5.

Example C14 (Comparative)

Samples were prepared according to General Preparation of Nonwoven Samples using PP 3960 polypropylene and 0.50% Antistat 1. Oil and water repellency and static charge dissipation data are listed in Table 5.

Example C15 (Comparative)

Samples were prepared according to General Preparation of Nonwoven Samples using PP 3960 polypropylene and 1% Antistat 3. Oil and water repellency and static charge dissipation data are listed in Table 5.

Example C16 (Comparative)

Samples were prepared according to General Preparation of Nonwoven Samples using PP 3960 polypropylene and 1% Antistat 5. Oil and water repellency and static charge dissipation data are listed in Table 5.

Example C17 (Comparative)

Samples were prepared according to General Preparation of Nonwoven Samples using PP 3960 polypropylene and 1% Antistat 6. Oil and water repellency and static charge dissipation data are listed in Table 5.

Example C18 (Comparative)

Samples were prepared according to General Preparation of Nonwoven Samples using PP 3960 polypropylene and 1% Antistat 7. Oil and water repellency and static charge dissipation data are listed in Table 5.

Example C19 (Comparative)

Samples were prepared according to General Preparation of Nonwoven Samples using PP 3960 polypropylene and 1% Antistat 2. Oil and water repellency and static charge dissipation data are listed in Table 5.

Example C20 (Comparative)

Samples were prepared according to General Preparation of Nonwoven Samples using PP 3960 polypropylene and 1% Antistat 4. Oil and water repellency and static charge dissipation data are listed in Table 5.

Example C21 (Comparative)

Samples were prepared according to General Preparation of Nonwoven Samples using PP 3960 polypropylene and 1% Antistat 8. Oil and water repellency and static charge dissipation data are listed in Table 5.

Example 1

Samples were prepared according to General Preparation of Nonwoven Samples using PS 440-200 polyurethane, 2% Antistat 1 and 2% FR-1. Oil and water repellency and static charge dissipation data are listed in Table 3.

Example 2

Samples were prepared according to General Preparation of Nonwoven Samples using PE 6806 polyethylene, 1% Antistat 1 and 1% FR-1. Oil and water repellency and static charge dissipation data are listed in Table 4.

Example 3

Samples were prepared according to General Preparation of Nonwoven Samples using PP 3960 polypropylene, 1% Antistat 1 and 1% FR-1. Oil and water repellency and static charge dissipation data are listed in Table 5.

Example 4

Samples were prepared according to General Preparation of Nonwoven Samples using PP 3960 polypropylene, 1% Antistat 3 and 1% FR-1. Oil and water repellency and static charge dissipation data are listed in Table 5.

Example 5

Samples were prepared according to General Preparation of Nonwoven Samples using PP 3960 polypropylene, 1% Antistat 4 and 1% FR-1. Oil and water repellency and static charge dissipation data are listed in Table 5.

Example 6

Samples were prepared according to General Preparation of Nonwoven Samples using PP 3960 polypropylene, 1% Antistat 1 and 1.5% FR-2. Oil and water repellency and static charge dissipation data are listed in Table 5.

Example 7

Samples were prepared according to General Preparation of Nonwoven Samples using PP 3960 polypropylene, 1% Antistat 2 and 1.5% FR-1. Oil and water repellency and static charge dissipation data are listed in Table 5.

TABLE 3

Oil and Water Repellency and Static Charge Dissipation of PS 440-200 Nonwovens

| Example | EFD* (microns) | Oil Repellency (Water repellency) | Charge (Kvolts) | | | Decay Rate (seconds) | | |
|---|---|---|---|---|---|---|---|---|
| | | | 10% RH | 25% RH | 50% RH | 10% RH | 25% RH | 50% RH |
| 1 | 11.4 | 8 (8) | 5+ | 5+ | 5+ | 0.99 | 0.85 | 0.30 |
| C1 | 14.2 | 0 (2) | | 5+ | 5+ | | >60 | 46.02 |
| C2 | 11 | 8 (9) | 5+ | 5+ | 5+ | 16.37 | 18.36 | 5.12 |
| C10 | 13.4 | 0 (2) | 5+ | 5+ | 5+ | 1.08 | 1.06 | 0.473 |

*Effective Fiber Diameter

TABLE 4

Oil and Water Repellency and Static Charge Dissipation of PE 6806 Nonwovens

| Example | EFD* (microns) | Oil Repellency (Water repellency) | Charge (Kvolts) | | | Decay Rate (seconds) | | |
|---|---|---|---|---|---|---|---|---|
| | | | 10% RH | 25% RH | 50% RH | 10% RH | 25% RH | 50% RH |
| 2 | 15.3 | 3 (10) | 5+ | 5+ | 5+ | 0.14 | 0.06 | 0.04 |
| C-4 | 16 | 6 (10) | 0.5 | 1.28 | 0.91 | >60 | 0.01 | 39.48 |
| C-3 | 14.8 | 0 (2) | | | 0.75 | | | >60 |
| C11 | 15.1 | 0 (2) | 5+ | 5+ | 5+ | 0.1 | 0.06 | 0.01 |

*Effective Fiber Diameter

TABLE 5

Oil and Water Repellency and Static Charge Dissipation of PP 3960 Nonwovens

| Example | EFD* (microns) | Oil Repellency (Water repellency) | Charge (Kvolts) | | | Decay Rate (seconds) | | |
|---|---|---|---|---|---|---|---|---|
| | | | 10% RH | 25% RH | 50% RH | 10% RH | 25% RH | 50% RH |
| 3 | 8.7 | 3 (9) | 5+ | 5+ | 5+ | 2.03 | 2.9 | 0.79 |
| 4 | 8.9 | 2 (9) | 5+ | 5+ | 5+ | 1.41 | 1.02 | 1.51 |
| 5 | 9 | 2 (9) | 5+ | 5+ | 5+ | 0.56 | 0.41 | 0.38 |
| 6 | 9.9 | 1 (8) | 4.75 | 5 | 5+ | 0.61 | 0.44 | 0.61 |
| 7 | 9.4 | 2 (9) | 5+ | 5+ | 5+ | 0.27 | 0.23 | 0.97 |
| 8 | 10.6 | 1 (9) | 4.75 | 5+ | 5+ | 0.17 | 0.12 | 0.24 |
| C5 | 7.9 | 0 (2) | | | 2.59 | | | >60 |
| C6 | 10.2 | | | | 5+ | | | >60 |
| C7 | 10.7 | | | | 5+ | | | >60 |
| C8 | 8.8 | 1 (7) | | | 0.52 | | | >60 |
| C9 | 9.0 | 0.5 (8) | | | -2.01 | | | >60 |
| C12 | 9.5 | 0 (2) | 4.45 | 4.99 | 4.99 | 0.26 | 0.3 | 0.41 |
| C13 | 10.1 | | | 5+ | 5+ | | >60 | 2.64 |
| C14 | 10.3 | | | | 3.75 | | | >60 |
| C15 | 10.7 | 0 (2) | 5+ | 5+ | 5+ | 1.83 | 4.66 | 1.74 |
| C16 | 10.4 | | | 4.1 | 5+ | 1.19 | 0.93 | 0.40 |
| C17 | 10.1 | | | 5+ | 5+ | | >60 | 3.64 |
| C18 | 11.2 | | 5+ | 5+ | 5+ | 1.66 | 0.82 | 0.13 |
| C19 | 10.7 | 0 (2) | 4.92 | 5.00 | 4.96 | 8.31 | 1.75 | 0.59 |
| C20 | 10.2 | 0 (2) | 5.00 | 5+ | 5+ | 2.47 | 3.97 | 0.92 |
| C21 | 11.2 | 0 (2) | | | 4.23 | | | >60 |

*Effective Fiber Diameter

In one case, the addition of antistat and repellent (Example 8, Table 5) to the PP 3960 exhibited significantly increased antistatic character compared to PP 3960 containing only antistat (Comparative Example 21, Table 5).

Various modifications and alterations of this invention will become apparent to those skilled in the art without departing from the scope and spirit of this invention. It should be understood that this invention is not intended to be unduly limited by the illustrative embodiments and examples set forth herein and that theses examples and embodiments are presented by way of example only with the scope of the invention intended to be limited only by the claims as set forth herein.

What is claimed is:

1. A water- and oil-repellent, antistatic composition comprising the blend of (a) at least one polymeric salt consisting of (i) at least one cation having at least one polyoxyalkylene moiety bonded to a cationic nitrogen center and (ii) at least one weakly coordinating anion, the conjugate acid of the anion having an acidity greater than or equal to that of a hydrocarbon sulfonic acid; and (b) at least one fluorochemical repellent; wherein said composition is blended with at least one insulating material.

2. The composition of claim 1, wherein said cation is represented by one of the following formulae:

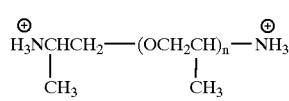 (I)

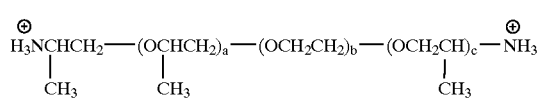 (II)

 (III)

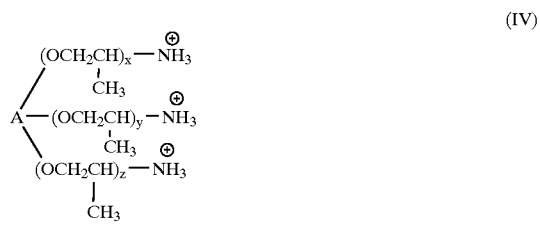 (IV)

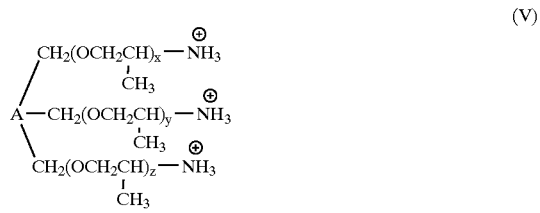 (V)

 (VI)

wherein, n is an integer of 3 to 50, b is an integer of 5 to 150, a and c, the same or different, each is an integer from 0 to 5, where a+c is an integer from 2 to 5, A is a CH≡,CH$_3$C≡, CH$_3$CH$_2$C≡, or a

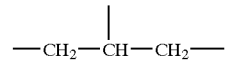

group, x, y and z, equal or different, are integers of 1 to 30 such that the sum of x+y+z≧5, POA is either a homopolymer or a copolymer that is random, blocked, or alternating, and POA comprises 2 to 50 units represented by the formula ((CH$_2$)$_m$CH(R$^3$)O) where each unit independently has m and R$^3$, where m is an integer from 1 to 4, R$^3$ is independently hydrogen or a lower alkyl group, R$^1$ is independently an alkyl, an alicyclic, an aryl, an alkalicyclic, an arylalicyclic, or an alicyclicaryl group that optionally contains one or more heteroatoms, R$^2$ is independently hydrogen, an alkyl, an alicyclic, an aryl, an alkalicyclic, an arylalicyclic, or an alicyclicaryl group that optionally contains one or more heteroatoms, and d is an integer from 1 to 4.

3. The composition of claim 1, wherein said cation is derived from amines selected from the group consisting of:

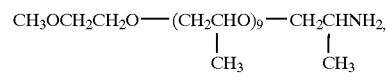

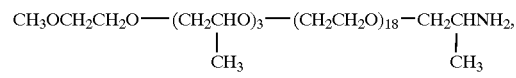

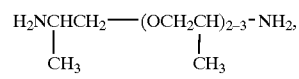

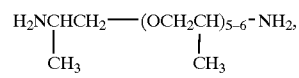

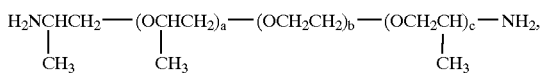

wherein b is ~8.5 and a + c is ~2.5,

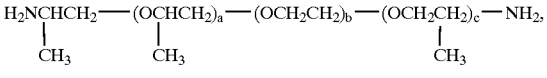

wherein b is ~15.5 and a + c is ~2.5,

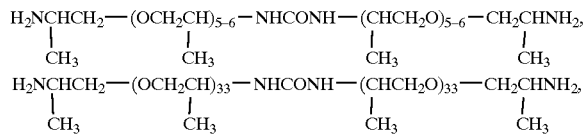

-continued

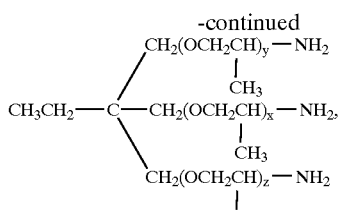

wherein x + y + z ~ 5-6, (10)

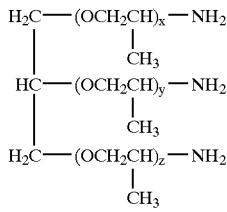

wherein x + y + z ~ 30, and (11)

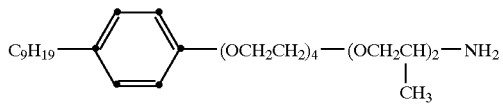

where the number of repeat units for the polyoxyalkylene moieties is approximate.

4. The composition of claim 1, wherein said cation is selected from the group consisting of
[$C_{12}H_{25}N^+(CH_3)(CH_2CH_2O)_mH(CH_2CH_2O)_nH$]; (m+n=15),
[$C_6H_5CH_2N^+(CH_3)(CH_2CH_2O)_mH(CH_2CH_2O)_nH$]; (m+n=15), where $C_6H_5CH_2$=benzyl,
[$C_{18}H_{37}N^+(CH_3)(CH_2CH_2O)_mH(CH_2CH_2O)_nH$]; (m+n=15),
[$C_{18}H_{37}N^+(CH_3)(CH_2CH_2O)_mH(CH_2CHCH_3O)_nH$]; (m+n=15),
[$C_{12}H_{25}N^+(CH_3)(CH_2CH_2O)_mH(CH_2CH_2O)_nH$]; (m+n=5),
[$C_{12}H_{25}N^+(CH_3)_2(CH_2CHCH_3O)_mH$]; (m=15),
[$C_{12}H_{25}N^+(CH_3)_2(CH_2CH_2CH_2CH_2O)_mH$]; (m=15)
[$C_{12}H_{25}N^+(CH_3)_2(CH_2CH_2O)_mH$]; (m=15),
[$C_8H_{17}N^+(CH_3)_2(CH_2CH_2O)_mH$]; (m=8),
[$C_{12}H_{25}N^+(CH_2CH_2O)_mH(CH_2CH_2O)_nH(CH_2CH_2O)_oH$]; (m+n+o=15), and
[$N^+(CH_2CH_2O)_mH(CH_2CH_2O)_nH(CH_2CH_2O)_oH(CH_2CH_2O)_pH$]; (m+n+o+p=20);
wherein the number of repeat units for the polyoxyalkylene moieties is approximate.

5. The composition of claim 1, wherein said hydrocarbon sulfonic acid has from 1 to about 20 carbon atoms.

6. The composition of claim 1, wherein the Hammett acidity function, $H_0$, of said conjugate acid is less than about −7.

7. The composition of claim 1, wherein said Hammett acidity function, $H_0$, of said conjugate acid is less than about −10.

8. The composition of claim 1, wherein said anion is selected from the group consisting of organic anions and fluoroorganic anions.

9. The composition of claim 8, wherein said organic anions are selected from the group consisting of alkyl sulfonates, aryl sulfonates, and alkaryl sulfonates.

10. The composition of claim 8, wherein said fluoroorganic anions are perfluorinated.

11. The composition of claim 8, wherein said fluoroorganic anions are selected from the group consisting of $R_fSO_3^-$ (A)

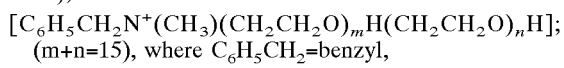 (B)

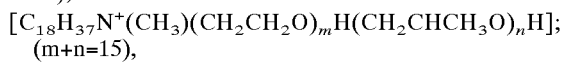 (C)

wherein:
each $R_f$ is independently a fluorinated alkyl or aryl group that is cyclic or acyclic, saturated or unsaturated, and may optionally contain catenated or terminal heteroatoms selected from the group consisting of N, O, and S,
Q is independently an $SO_2$ or a CO linking group, and
X is selected from the group consisting of $QR_f$, CN, halogen, H, alkyl, aryl, Q-alkyl, and Q-aryl.

12. The composition of claim 8, wherein said fluoroorganic anions are selected from the group consisting of perfluoroalkanesulfonates, cyanoperfluoroalkanesulfonylamides, bis(cyano)perfluoroalkanesulfonylmethides, cyano-bis-(perfluoroalkanesulfonyl)methides, bis(perfluoroalkanesulfonyl)imides, bis(perfluoroalkanesulfonyl)methides, tris(perfluoroalkanesulfonyl)methides, and mixtures thereof.

13. The composition of claim 1, wherein said polymeric salt is thermally stable at about 240° C.

14. The composition of claim 1, wherein said polymeric salt consists of at least one cation selected from the group consisting of
$C_{12}H_{25}N^+(CH_3)[(CH_2CH_2O)_mH][(CH_2CH_2O)_nH]$; (m+n=15),
$C_{18}H_{37}N^+(CH_3)[(CH_2CH_2O)_mH][(CH_2CH_2O)_nH]$; (m+n=15),
$C_{12}H_{25}N^+(CH_3)[(CH_2CH_2O)_mH][(CH_2CH_2O)_nH]$; (m+n=5), and
$C_{12}H_{25}N^+(CH_3)_2(CH_2CH_2O)_mH$]; m=15; and
at least one weakly coordinating anion.

15. The composition of claim 1, wherein said fluorochemical repellent comprises at least one fluorochemical group that contains a perfluorinated carbon chain having from 3 to about 20 carbon atoms.

16. The composition of claim 15, wherein said fluorochemical group is a perfluoroaliphatic group.

17. The composition of claim 1, wherein said fluorochemical repellent comprises at least one fluorochemical selected from the group consisting of fluorochemical urethanes, ureas and substituted ureas, esters, ethers, alcohols, epoxides, allophanates, amides, amines (and salts thereof), acids (and salts thereof), carbodiimides, guanidines, oxazolidinones, isocyanurates, piperazines, aminoalcohols, sulfones, imides, biurets, acrylate and methacrylate homopolymers and copolymers, siloxanes, alkoxysilanes, chlorosilanes, and mixtures thereof.

18. The composition of claim 1, wherein said fluorochemical repellent comprises at least one fluorochemical selected from the group consisting of fluorochemical oxazolidinones, fluorochemical esters, fluorochemical amides, and mixtures thereof.

19. The composition of claim 1, wherein said composition is melt blended with at least one insulation material.

20. A water- and oil-repellent, antistatic composition comprising (a) at least one polymeric salt consisting of (i) at least one cation having at least one polyoxyalkylene moiety bonded to a cationic nitrogen center, (ii) at least one weakly coordinating fluoroorganic anion; and (b) at least one fluorochemical repellent.

21. The composition of claim 20, wherein said composition is topically applied to an insulating material.

22. The composition of claim 20, wherein said cation is represented by one of the following formulae:

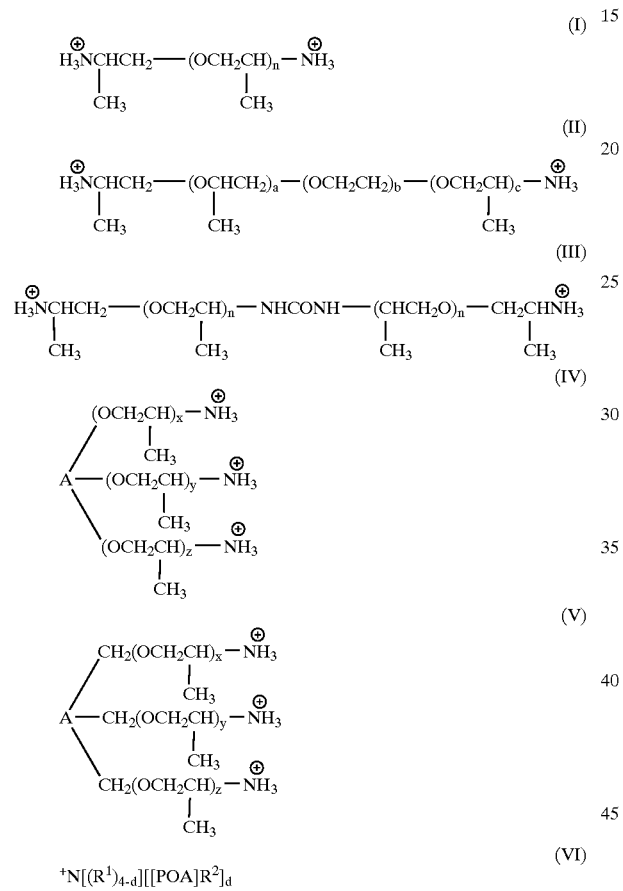

wherein:
n is an integer of 3 to 50, b is an integer of 5 to 150, a and c, the same or different, each is an integer from 0 to 5, where a+c is an integer from 2 to 5, A is a CH≡, $CH_3C\equiv$, $CH_3CH_2C\equiv$, or a

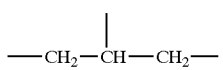

group, x, y and z, equal or different, are integers of 1 to 30 such that the sum of $x+y+z \geqq 5$, POA is either a homopolymer or a copolymer that is random, blocked, or alternating, and comprises 2 to 50 units represented by the formula $((CH_2)_m CH(R^3)O)$ where each unit independently has m and $R^3$, wherein:
m is an integer from 1 to 4,
$R^3$ is independently hydrogen or a lower alkyl group, $R^1$ is independently an alkyl, an alicyclic, an aryl, an alkalicyclic, an arylalicyclic, or an alicyclicaryl group that optionally contains one or more heteroatoms, $R^2$ is independently hydrogen, an alkyl, an alicyclic, an aryl, an alkalicyclic, an arylalicyclic, or an alicyclicaryl group that optionally contains one or more heteroatoms, and d is an integer from 1 to 4.

23. The composition of claim 20, wherein said cation is derived from amines selected from the group consisting of

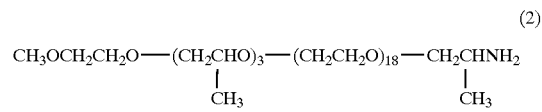

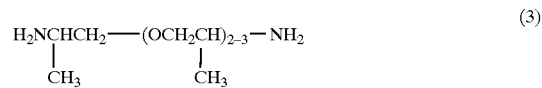

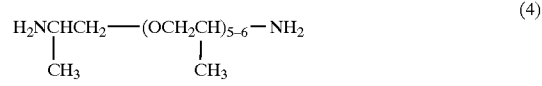

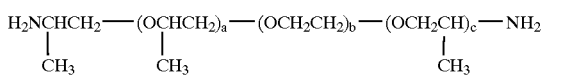

wherein b is ~8.5 and a + c is ~2.5,

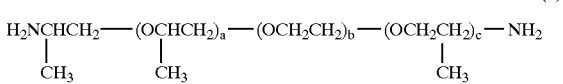

wherein b is ~15.5 and a + c is ~2.5,

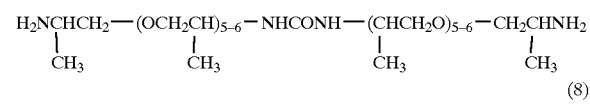

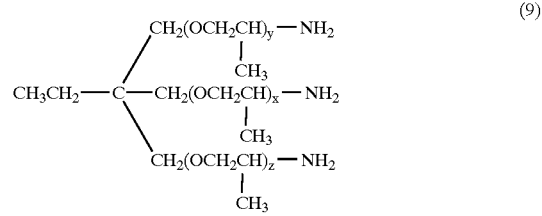

wherein x + y + z ~ 5–6,

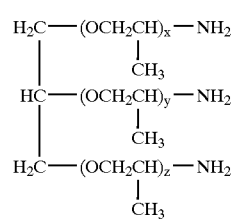

wherein x + y + z ~ 30,

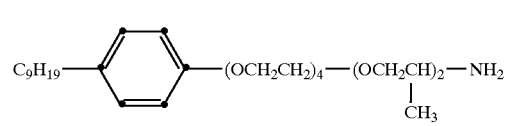

wherein the number of repeat units for the polyoxyalkylene moieties is approximate.

24. The composition of claim 20, wherein said cation is selected from the group consisting of $[C_{12}H_{25}N^+(CH_3)(CH_2CH_2O)_mH(CH_2CH_2O)_nH]$; (m+n=15), $[C_6H_5CH_2N^+(CH_3)(CH_2CH_2O)_mH(CH_2CH_2O)_nH]$; (m+n=15), where $C_6H_5CH_2$=benzyl, $[C_{18}H_{37}N^+(CH_3)(CH_2CH_2O)_mH(CH_2CH_2O)_nH]$; (m+n=15), $[C_{18}H_{37}N^+(CH_3)(CH_2CH_2O)_mH(CH_2CHCH_3O)_nH]$; (m+n=15), $[C_{12}H_{25}N^+CH_3)(CH_2CH_2O)_mH(CH_2CH_2O)_nH]$; (m+n=5), $[C_{12}H_{25}N^+(CH_3)_2(CH_2CHCH_3O)_mH]$; (m=15), $[C_{12}H_{25}N^+(CH_3)_2(CH_2CH_2CH_2CH_2O)_mH]$; (m=15), $[C_{12}H_{25}N^+(CH_3)_2(CH_2CH_2O)_mH]$; (m=15), $[C_8H_{17}N^+(CH_3)_2(CH_2CH_2O)_mH]$; (m=8), $[C_{12}H_{25}N^+(CH_2CH_2O)_mH(CH_2CH_2O)_nH(CH_2CH_2O)_oH]$; (m+n+o=15), and $[N^+(CH_2CH_2O)_mH(CH_2CH_2O)_nH(CH_2CH_2O)_oH(CH_2CH_2O)_pH]$; (m+n+o+p=20);

wherein the number of repeat units for the polyoxyalkylene moieties is approximate.

25. The composition of claim 20, wherein said weakly coordinating fluoroorganic anion is perfluorinated.

26. The composition of claim 20, wherein said weakly coordinating fluoroorganic anion is selected from the group consisting of

wherein:
each $R_f$ is independently a fluorinated alkyl or aryl group that is cyclic or acyclic, saturated or unsaturated, and may optionally contain catenated or terminal heteroatoms selected from the group consisting of N, O, and S, Q is independently an $SO_2$ or a CO linking group, and X is selected from the group consisting of $QR_f$, CN, halogen, H, alkyl, aryl, Q-alkyl, and Q-aryl.

27. The composition of claim 20, wherein said fluoroorganic anion is selected from the group consisting of perfluoroalkanesulfonates, cyanoperfluoroalkanesulfonylamides, bis(cyano)perfluoroalkanesulfonylmethides, cyano-bis-(perfluoroalkanesulfonyl)imides, bis(perfluoroalkanesulfonyl)imides, bis(perfluoroalkanesulfonyl)methides, tris(perfluoroalkanesulfonyl)methides, and mixtures thereof.

28. The composition of claim 20, wherein said polymeric salt consists of at least one cation selected from the group consisting of $C_{12}H_{25}N^+(CH_3)[(CH_2CH_2O)_mH][(CH_2CH_2O)_nH]$; (m+n=15), $C_{18}H_{37}N^+(CH_3)[(CH_2CH_2O)_mH][(CH_2CH_2O)_nH]$; (m+n=15), $C_{12}H_{25}N^+(CH_3)[(CH_2CH_2O)_mH][(CH_2CH_2O)_nH]$; (m+n=5), and $C_{12}H_{25}N^+(CH_3)_2(CH_2CH_2O)_mH]$; m=15;

and at least one weakly coordinating fluoroorganic anion.

29. The composition of claim 20, wherein said fluorochemical repellent comprises at least one fluorochemical group that contains a perfluorinated carbon chain having from 3 to about 20 carbon atoms.

30. The composition of claim 29, wherein said fluorochemical group is a perfluoroaliphatic group.

31. The composition of claim 20, wherein said fluorochemical repellent comprises at least one fluorochemical selected from the group consisting of fluorochemical urethanes, ureas and substituted ureas, esters, ethers, alcohols, epoxides, allophanates, amides, amines (and salts thereof), acids (and salts thereof), carbodiimides, guanidines, oxazolidinones, isocyanurates, piperazines, aminoalcohols, sulfones, imides, biurets, acrylate and methacrylate homopolymers and copolymers, siloxanes, alkoxysilanes, chlorosilanes, and mixtures thereof.

32. The composition of claim 31, wherein said fluorochemical repellent comprises at least one fluorochemical selected from the group consisting of fluorochemical oxazolidinones, fluorochemical esters, fluorochemical amides, and mixtures thereof.

33. The composition of claim 21, wherein said insulating material is selected from the group consisting of thermoplastic polymers and thermoset polymers.

34. The composition of claim 33, wherein said insulating material is a thermoplastic polymer.

35. A water- and oil-repellent, antistatic composition comprising (a) at least one polymeric salt consisting of (i) at least one cation having at least one polyoxyalkylene moiety bonded to a cationic nitrogen center, and (ii) at least one weakly coordinating anion, the conjugate acid of said anion having an acidity greater than or equal to that of methane sulfonic acid or p-toluene sulfonic acid; (b) at least one fluorochemical repellent; and (c) at least one thermoplastic polymer; wherein said composition is prepared by forming a blend of components (a), (b), and (c).

36. The composition of claim 35, wherein said blend is a melt blend.

37. A fiber comprising the composition of claim 1.

38. A fabric comprising the fiber of claim 1.

39. A film comprising the composition of claim 1.

40. A molded or blown article comprising the composition claim 1.

41. A coating comprising the composition of claim 1.

42. A process for preparing a water- and oil-repellent, antistatic composition comprising the steps of (a) combining (i) at least one polymeric salt consisting of at least one cation having at least one polyoxyalkylene moiety bonded to a cationic nitrogen center and at least one anion, said anion being a weakly coordinating anion, the conjugate acid of said anion having an acidity greater than or equal to that of a hydrocarbon sulfonic acid, (ii) at least one fluorochemical repellent, and (iii) at least one thermoplastic polymer; and (b) melt processing the resulting combination.

43. The process of claim 42, wherein either said polymeric salt or said fluorochemical repellent is combined with said thermoplastic polymer, and the other is topically applied to the surface of the resulting melt-processed combination.

44. A process for preparing a water- and oil-repellent, antistatic composition comprising the steps of (a) combining (i) at least one polymeric salt consisting of at least one cation having at least one polyoxyalkylene moiety bonded to a cationic nitrogen center and an anion, and at least one anion, said anion being a weakly coordinating anion, the conjugate acid of said anion having an acidity greater than or equal to that of a hydrocarbon sulfonic acid, (ii) at least one fluorochemical repellent, and (iii) at least one thermosetting polymer, ceramer, or a reactive precursor of said polymer or ceramer; and (b) allowing the resulting combination to cure.

45. A process for preparing a water- and oil-repellent, antistatic composition comprising the step of applying a topical treatment composition to at least a portion of at least one surface of at least one insulating material, said topical treatment composition comprising (a) at least one polymeric salt consisting of at least one cation having at least one polyoxyalkylene moiety bonded to a cationic nitrogen center and at least one anion, said anion being a weakly coordinating fluoroorganic anion; and (b) at least one fluorochemical repellent.

46. The process of claim 45, wherein a first topical treatment composition comprises said polymeric salt, a second topical treatment composition comprises said fluorochemical repellent, and said first and second topical treatment compositions are sequentially applied to said portion of said surface.

47. A process for preparing a water- and oil-repellent, antistatic composition comprising the steps of (a) dissolving (i) at least one polymeric salt consisting of at least one cation having at least one polyoxyalkylene moiety bonded to a cationic nitrogen center and an anion, and at least one anion, said anion being a weakly coordinating fluoroorganic anion, (ii) at least one fluorochemical repellent, and (iii) at least one insulating material in at least one solvent; (b) casting or coating the resulting solution on at least one substrate; and (c) allowing evaporation of said solvent.

48. A process for preparing a water- and oil-repellent, antistatic composition comprising the steps of (a) combining (i) at least one polymeric salt consisting of at least cation having at least one polyoxyalkylene moiety bonded to a cationic nitrogen center and at least one anion, said anion being a weakly coordinating anion, the conjugate acid of said anion having an acidity greater than or equal to that of a hydrocarbon sulfonic acid, (ii) at least one fluorochemical repellent, and (iii) at least one monomer; and (b) allowing polymerization of the monomer to occur.

* * * * *

UNITED STATES PATENT AND TRADEMARK OFFICE
CERTIFICATE OF CORRECTION

PATENT NO. : 6,924,329 B2  Page 1 of 3
APPLICATION NO. : 09/992877
DATED : August 2, 2005
INVENTOR(S) : Thomas P. Klun It is certified that error appears in the above-identified patent and that said Letters Patent is hereby corrected as shown below:

On the Title Page, Item (56)
Under U.S. Patent Documents, below "4,847,187" insert
--4,939,204 A  7/1990
Efford 4,975,363 A  12/1990
Cavallo et al.--, therefor.

On the Title Page, Item (56)
Under "Foreign Patent Documents," the following should be added:
--JP 46-25558  07/23/1971
JP 47-20201  06/08/1972
JP 53-15747  05/26/1978
SU 468527  11/07/1980
SU 802429  02/07/1981
SU 802430  02/07/1981--

Column 6

Line 25, delete "$\begin{smallmatrix}(OCH_2CH_2)_c\\|\\CH_3\end{smallmatrix}$" and insert --$\begin{smallmatrix}(OCH_2CH)_c\\|\\CH_3\end{smallmatrix}$--, therefore.

Line 45, after "HC—(OCH$_2$CH)$_y$—NH$_2$" delete "and".

Line 51, after "30" insert --and--.

Column 7

Line 4, delete "15" and insert --5--, therefor.

Column 11

Line 16, delete "CH$_2$CH$_2$O)$_m$" and insert --(CH$_2$CH$_2$O)$_m$--, therefor.

Line 18, delete "[(CH$_2$CH$_2$O)$_n$H]$^{31}$" and insert --[(CH$_2$CH$_2$O)$_n$H]--, therefor.

Line 19, delete "N" and insert --$\bar{N}$--, therefor.

UNITED STATES PATENT AND TRADEMARK OFFICE
CERTIFICATE OF CORRECTION

PATENT NO. : 6,924,329 B2
APPLICATION NO. : 09/992877
DATED : August 2, 2005
INVENTOR(S) : Thomas P. Klun It is certified that error appears in the above-identified patent and that said Letters Patent is hereby corrected as shown below:

Column 12

Line 13, delete "15" and insert --5--, therefor.

Line 42, delete " [$^-O_3SCF_2CF_2SO_3$—]" and insert --[$^-O_3SCF_2CF_2CF_2SO_3^-$]--, therefor.

Line 63, delete "$(CH_2CH_2O)_nH$]" and insert --$(CH_2H_2O)_nH]_2$--, therefor.

Column 13

Line 2, after "(m+n=15)" insert --,--.

Line 4, after "(m+n=15)" insert --,--.

Line 14, after "imides" delete ")".

Column 22

Table 1, column 2, line 10, delete "$^+H^-Cl$]" and insert --H $^-Cl$]--, therefor.

Column 26

Line 34, delete "$(CH_2O)_n$" and insert --$(CH_2CH_2O)_n$--, therefor.

Column 28

Line 56, after "FR-1" insert --.--.

Column 29

Line 5, delete "Sample" and insert --Samples--, therefor.

Line 12, delete "Sample" and insert --Samples--, therefor.

Column 34

Line 43, claim 3, delete "$^-NH_2$" and insert -- —$NH_2$--, therefor.

Line 46, claim 3, delete "$^-NH_2$" and insert -- —$NH_2$--, therefor.

UNITED STATES PATENT AND TRADEMARK OFFICE
CERTIFICATE OF CORRECTION

PATENT NO. : 6,924,329 B2
APPLICATION NO. : 09/992877
DATED : August 2, 2005
INVENTOR(S) : Thomas P. Klun It is certified that error appears in the above-identified patent and that said Letters Patent is hereby corrected as shown below:

Column 36

Line 47, claim 14, delete "$(CH_2CH_2O)_mH]$" and insert --$[(CH_2CH_2O)_mH]$--, therefor.

Column 38

Line 30, claim 23, delete " " and insert -- 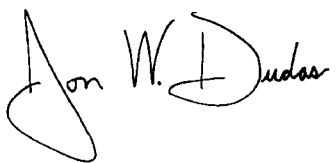 --, therefor.

Signed and Sealed this

Fourth Day of March, 2008

JON W. DUDAS
*Director of the United States Patent and Trademark Office*